United States Patent
Avadhanam et al.

(10) Patent No.: US 12,207,079 B2
(45) Date of Patent: Jan. 21, 2025

(54) SEAMLESS PLAYBACK AND SWITCHING FOR WIRELESS COMMUNICATIONS DEVICES

(71) Applicant: Cypress Semiconductor Corporation, San Jose, CA (US)

(72) Inventors: Krishna Kishore Avadhanam, Bangalore (IN); Ashish Kumar Malot, Bangalore (IN); Robert Zopf, Rancho Santa Margarita, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/302,568

(22) Filed: Apr. 18, 2023

(65) Prior Publication Data

US 2023/0254748 A1    Aug. 10, 2023

Related U.S. Application Data

(63) Continuation of application No. 17/184,441, filed on Feb. 24, 2021, now Pat. No. 11,659,466.

(60) Provisional application No. 62/981,389, filed on Feb. 25, 2020.

(51) Int. Cl.
*H04W 36/30* (2009.01)

(52) U.S. Cl.
CPC ................. *H04W 36/304* (2023.05)

(58) Field of Classification Search
CPC ... H04W 36/14; H04W 36/0011; H04W 4/80; H04W 36/18; H04W 36/30; H04W 36/0022; H04W 36/00837; H04W 36/0083

See application file for complete search history.

(56) References Cited

U.S. PATENT DOCUMENTS

| | | | |
|---|---|---|---|
| 2008/0232299 A1* | 9/2008 | Mosig | H04W 48/18 370/328 |
| 2013/0130617 A1* | 5/2013 | Tamura | H04L 65/80 455/3.06 |
| 2014/0153489 A1* | 6/2014 | Perras | H04W 60/00 370/328 |
| 2016/0278035 A1* | 9/2016 | Yae | H04W 4/80 |
| 2016/0366711 A1* | 12/2016 | Shanbhag | H04L 67/12 |
| 2018/0242174 A1* | 8/2018 | Thotad | H04L 41/0668 |
| 2022/0141900 A1* | 5/2022 | Kanma | H04W 84/10 370/329 |

* cited by examiner

*Primary Examiner* — Allahyar Kasraian

(57) ABSTRACT

Systems, methods, and devices seamlessly playback data files using one or more wireless connections. Methods include establishing a first wireless connection and a second wireless connection between a first device and a second device, the first wireless connection using a first communication protocol. Methods further include transmitting audio data via the first wireless connection and determining a switch should be initiated based on one or more signal quality metrics representing an estimate of a quality of the first wireless connection. Methods also include operating the second wireless connection in an active mode and switching to the second wireless connection using a second communication protocol, and the switching comprising beginning encapsulation of the audio data in Bluetooth packets for transmission in accordance with the second communication protocol, wherein the Bluetooth packets are encapsulated in one or more data packets of the second communication protocol.

20 Claims, 16 Drawing Sheets

SEAMLESS PLAYBACK AND SWITCHING FOR WIRELESS COMMUNICATIONS DEVICES

CROSS-REFERENCE TO RELATED APPLICATIONS

The present application is a Continuation of U.S. patent application Ser. No. 17/184,441, filed on Feb. 24, 2021, now U.S. Pat. No. 11,659,466 issued on May 23, 2023, which claims the benefit under 35 U.S.C. § 119 (e) of U.S. Provisional Patent Application No. 62/981,389 filed on Feb. 25, 2020, which are incorporated herein by reference in their entirety for all purposes.

TECHNICAL FIELD

This disclosure generally relates to wireless communications devices, and more specifically, to seamless playback of data files, such as audio files, between such wireless communications devices.

BACKGROUND

Wireless communications devices may communicate with each other via one or more communications modalities, such as a Wi-Fi connection or a Bluetooth connection. Accordingly, such wireless communication may be implemented in a manner compliant with a wireless communication protocol. Moreover, such wireless communications devices may include various hardware components to facilitate such communication. For example, wireless communications devices may include a Bluetooth radio and a Wi-Fi radio. Conventional techniques for utilizing such radios are limited because they are not able to efficiently and effectively ensure seamless switching between such connections for the purposes of playback of data files, such as audio files.

DETAILED DESCRIPTION

Figure 1:
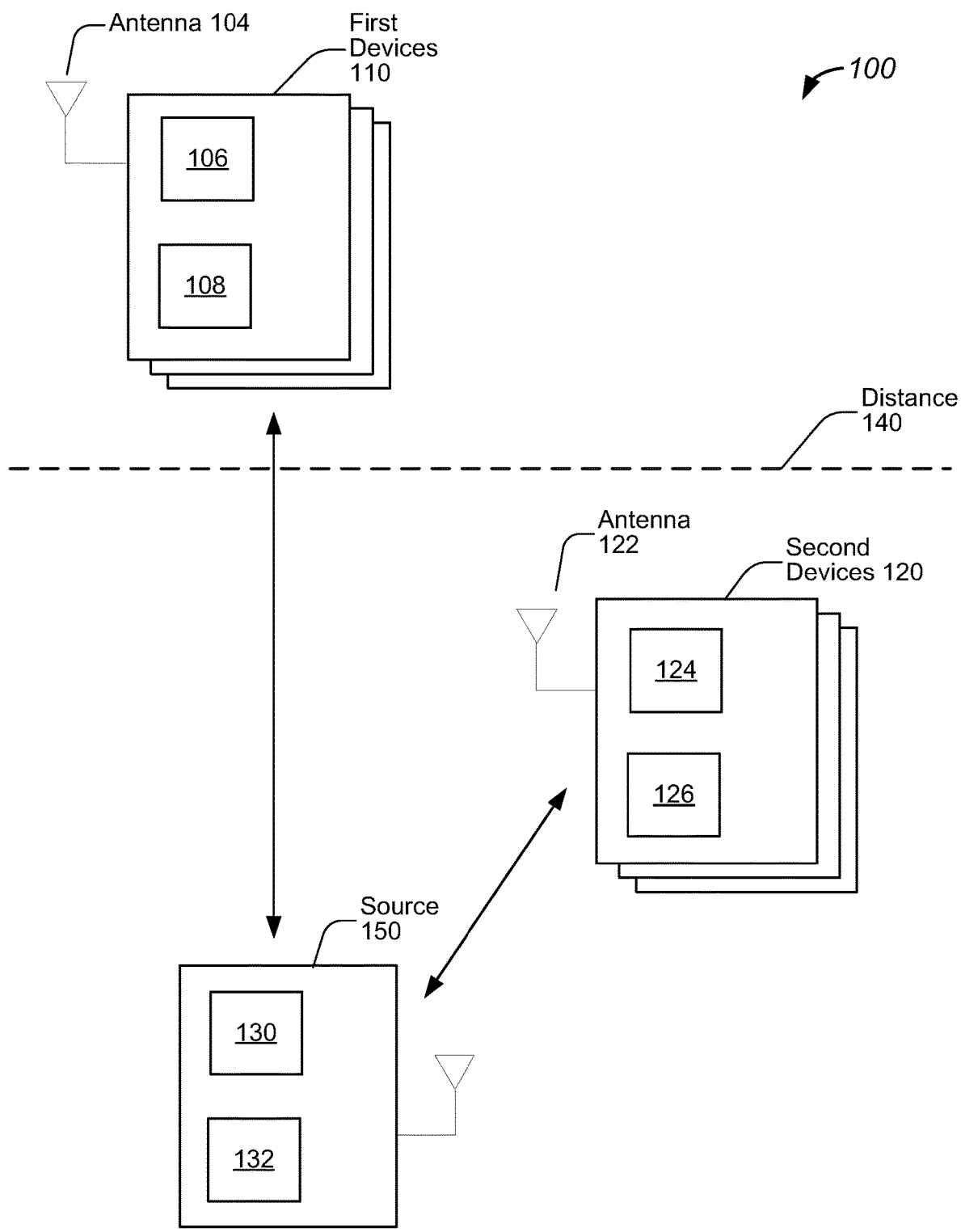
FIG. 1 illustrates an example of a system for seamless playback between wireless communications devices, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless communications devices may be configured to establish wireless communications connections using one or more communications modalities. For example, a wireless communications device may be capable of utilizing both Bluetooth and Wi-Fi technologies to communicate with other wireless communications devices. Such different modalities may have different operational characteristics that may make one preferable to another. For example, a Wi-Fi wireless connection may have better range than a Bluetooth wireless connection. However, it may consume more power. Accordingly, traditional approaches may result in stopping of playback when a range is exceeded, or poorer power performance.

Wireless communications devices disclosed herein provide the ability to seamlessly and dynamically switch between communications modalities in a manner that is compatible with and transparent to wireless communication devices used in applications that have stringent latency requirements. For example, when streaming an audio file from one device to another, embodiments disclosed herein are able to switch between communications modalities with no interruption in playback. As will be discussed in greater detail below, the switching between wireless communications modalities may be triggered based on one or more signal quality metrics and switch parameters to determine a switch should be made, and to automatically and dynamically implement such a handoff, thus enhancing the connectivity between the wireless communications devices.

As will be discussed in greater detail below wireless communications devices may be configured as source devices and sink devices in which data is transmitted from a source device to a sink device. In one example, a source device may be a music streamer that is configured to store and play digital music files, such as mp3s, WAV files, AAC files, FLAC files, or any other suitable digital format. In various embodiments, such digital music files may be streamed over a wireless connection to, for example, a wireless headset which may be a sink device. Accordingly, in this example, the streamer establishes a wireless connection with the wireless headset, and transmits data packets to the wireless headset.

As will also be discussed in greater detail below, the wireless headset and the streamer may both be capable of Bluetooth and Wi-Fi communication. Moreover, the user of the wireless headset may be moving. Accordingly, a distance between the streamer and the wireless headset may be variable. In such a situation, the Bluetooth connection may be better to use in some situations, and the Wi-Fi connection may be better to use in other situations. More specifically, if the user is within range, the Bluetooth connection may provide lower power consumption. If the user is farther away, the user may be out of range of the Bluetooth connection, and the Wi-Fi connection may provide higher signal quality. As will be discussed in greater detail below, embodiments disclosed herein are configured to dynamically identify and switch to a particular wireless connection to compensate for such changes in distance and position of source and sink devices, and ensure that overall signal quality and power consumption during streaming of such audio files is improved.

FIG. 1 illustrates an example of a system for seamless playback between wireless communications devices, configured in accordance with some embodiments. As will be discussed in greater detail below, a system, such as system 100, may be configured to include various wireless communications devices that are in communication with each other, and are configured to utilize wireless communications connections to stream data. More specifically, such wireless communications devices may be configured as one or more source devices and one or more sink devices. In such a configuration, the source device may stream a data file, such as an audio file, to a sink device, also referred to as a target device. As will be discussed in greater detail below, the source device and sink device may be configured to seamlessly switch between wireless connection modalities to compensate for changes in distances between the source and sink devices, thus ensuring seamless playback of the audio file despite such changes in distance.

In various embodiments, system 100 includes source 150 which may be a wireless communications device. As discussed above, wireless communications devices may be compatible with one or more wireless transmission protocols, such as a Wi-Fi protocol or a Bluetooth protocol. In one example, source 150 is a low energy Bluetooth device that is compatible with a Bluetooth Low Energy specification and protocol, also referred to as Bluetooth Smart. As also discussed above, source 150 may have multiple transceivers and radios configured to implement different wireless communications modalities. Accordingly, source 150 may include first transceiver 130 and second transceiver 132. In one example, first transceiver 130 may be a Wi-Fi transceiver, and second transceiver 132 may be a Bluetooth transceiver.

Source 150 may also include various other processing hardware and logic, as will be discussed in greater detail below with reference to FIG. 3. Accordingly, such processing logic and transceivers are configured to establish communications connections with other devices, and transmit data in the form of data packets via such communications connections and in accordance with their respective communications protocols. As also discussed above, source 150 may be configured as a source of streaming data which may be, for example, an audio file. Accordingly, source 150 may be a mobile device, such as smartphone or any other suitable streaming music player, that is configured to execute one or more streaming music applications. In this way, source 150 may additionally include memory configured to store such audio files.

System 100 also includes first devices 110 which may be wireless communications devices. As discussed above, such wireless communications devices may be compatible with one or more wireless transmission protocols, such as a Wi-Fi protocol or a Bluetooth protocol, and may also be low energy Bluetooth devices. As discussed above, first devices 110 may include multiple transceivers, such as transceivers 106 and 108, which are configured to support wireless communications modalities, such as Wi-Fi and Bluetooth, respectively. In various embodiments, first devices 110 are sink devices because they are configured to receive streamed data from source 150. For example, first devices 110 may be wireless devices such as wireless headsets coupled to source 150, which may be a smartphone. In this way, first devices 110 may be sink devices specifically configured to receive and play data streamed from source 150 via one or more antennas, such as antenna 104. As discussed above, and as also discussed in greater detail below with reference to FIG. 3, first devices 110 may also include processing logic and transceivers configured to establish communications connections with other devices, and receive and transmit data in the form of data packets via such communications connections and in accordance with their respective communications protocols.

System 100 may also include second devices 120 which may also be wireless communications devices. As similarly discussed above, second devices 120 may be compatible with one or more wireless transmission protocols, such as a Wi-Fi protocol or a Bluetooth protocol. As also discussed above, second devices 120 may include multiple transceivers, such as transceivers 124 and 126, which are configured to support wireless communications modalities, such as Wi-Fi and Bluetooth, respectively. In various embodiments, second devices 120 are also sink devices that are configured to receive streamed data from source 150 via one or more antennas, such as antenna 122. Accordingly, second devices 120 may also be wireless devices such as wireless headsets coupled to source 150. As discussed above, and as also discussed in greater detail below with reference to FIG. 3, second devices 120 may also include processing logic and transceivers configured to establish communications connections with other devices, and receive and transmit data in the form of data packets via such communications connections and in accordance with their respective communications protocols.

In various embodiments, first devices 110 may be located at a first position that is a first physical distance from source 150. Moreover, second devices 120 may be located at a second physical distance from source 150. Thus, FIG. 1 illustrates how sink devices may be coupled with a source device, but a distance between them may vary as the devices move. Accordingly, first devices 110 may move closer to source 150 during streaming of data. Moreover, second devices 120 may move further from source 150 during streaming of data. As shown in FIG. 1, a designated distance, such as distance 140 may represent an effective range of a particular communications modality. For example, in a distance from source 150 up until distance 140, a sink device may be in range of the Bluetooth radio of source 150. However, once the sink device exceeds the distance identified by distance 140, the range of the Bluetooth radio may be exceeded. However, communication may still be possible via the Wi-Fi radio, as the Wi-Fi radio may still be in range. Accordingly, as will be discussed in greater detail below, system 100 is configured to identify such a change, and seamlessly switch between communications modalities during streaming of the data.

Moreover, first devices 110 may start at a distance greater than distance 140, and may move to be a distance from source 150 that is less than distance 140. In this example, system 100 may also be configured to identify such a change, and seamlessly switch between communications modalities during streaming of the data such that they may switch from using Wi-Fi to using Bluetooth, which may be more energy efficient. It will be appreciated that while FIG. 1 illustrates first devices 110 and second devices 120, system 100 may include only first devices 110 or second devices 120. Moreover, system 100 may include only one of first devices 110 or only one of second devices 120.

Figure 2:
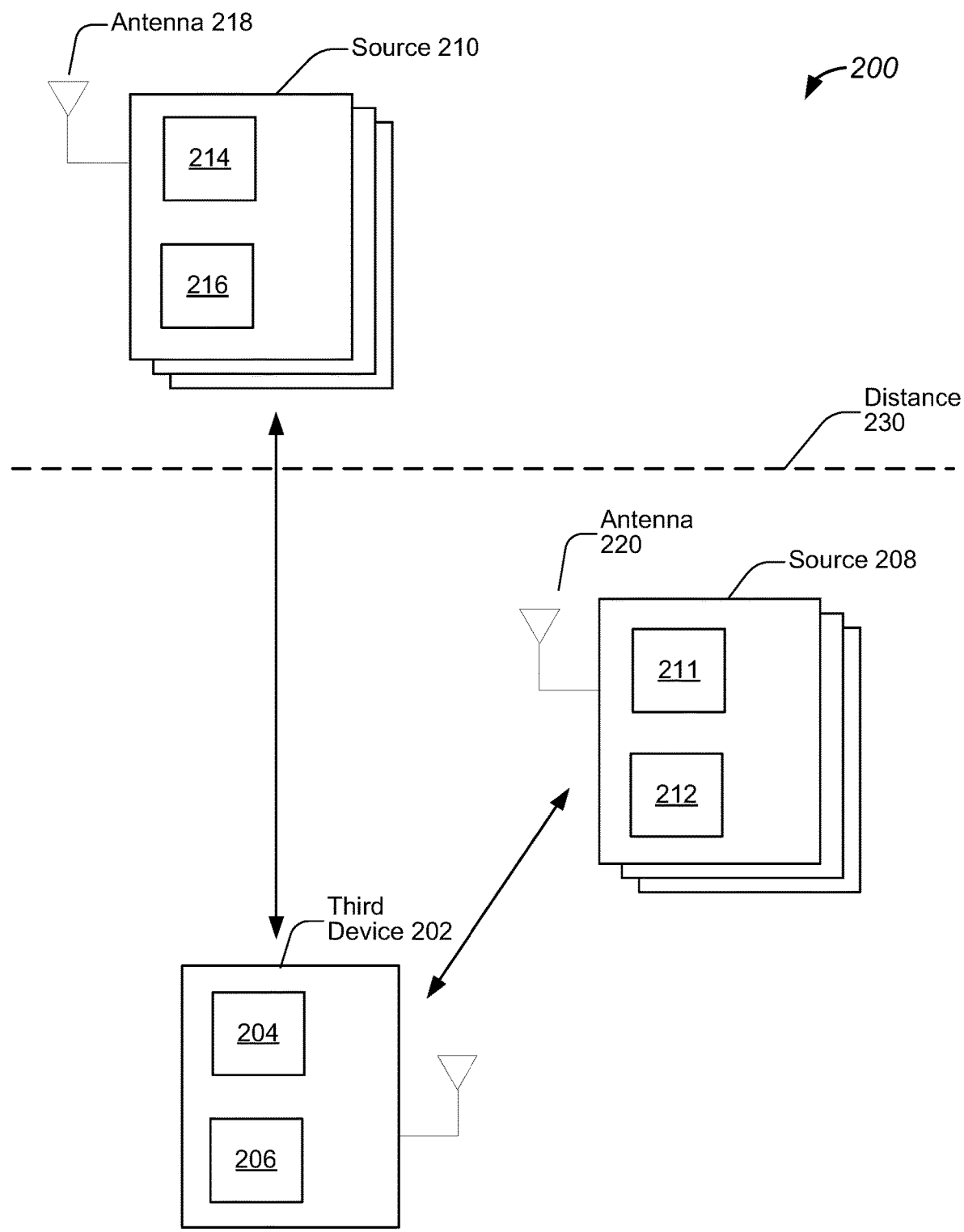
FIG. 2 illustrates an example of another system for seamless playback between wireless communications devices, configured in accordance with some embodiments.

FIG. 2 illustrates an example of another system for seamless playback between wireless communications devices, configured in accordance with some embodiments. As similarly discussed above, a system, such as system 200, may be configured to include various wireless communications devices that are in communication with each other, and are configured to utilize wireless communications connections to stream data. More specifically, such wireless communications devices may be configured as one or more source devices and one or more sink devices. As will be discussed in greater detail below, a source device may move or change distance from a sink device, and system 200 may be configured to compensate for such changes in distance.

As similarly discussed above, system 200 may include one or more sources, such as source 210 and source 208, and such sources may include processing hardware and transceivers. For example, source 210 may include transceivers 214 and 216 which may be Wi-Fi and Bluetooth transceivers, respectively. Moreover, source 208 may include transceivers 211 and 212 which may also be Wi-Fi and Bluetooth transceivers, respectively. Moreover, system 200 further includes third device 202 which includes transceivers 204 and 206 which may also be Wi-Fi and Bluetooth transceivers, respectively. As discussed above, third device 202 may be a sink device that is configured to receive streaming data from one or more sources. In one example, source 210 and source 208 may be mobile devices, such as smartphones, and third device 202 may be a sink device, such as a wireless speaker. Accordingly, third device 202 may be a wireless speaker that is stationary, while a source device, such as source 210, is a mobile device that may be moving around and changing distance with respect to third device 202.

As similarly discussed above, a designated distance, such as distance 230, may identify an effective range of a particular communications modality. Accordingly, in the example shown in FIG. 2, source 210 may be outside a range for Bluetooth communication, but may still be within Wi-Fi range. Moreover, source 208 may be within a range for both Bluetooth and Wi-Fi communication. As also noted above, the position of the sources may change. Accordingly, system 200 is configured to identify such changes, and seamlessly switch between communications modalities in response to identifying such changes. Moreover, as also similarly discussed above, while FIG. 2 shows sources 210 and 208, it will be appreciated that system 200 may be implemented with only source 210 or only source 208. Additional details regarding such determinations and seamless switching are discussed in greater detail below.

Figure 3:
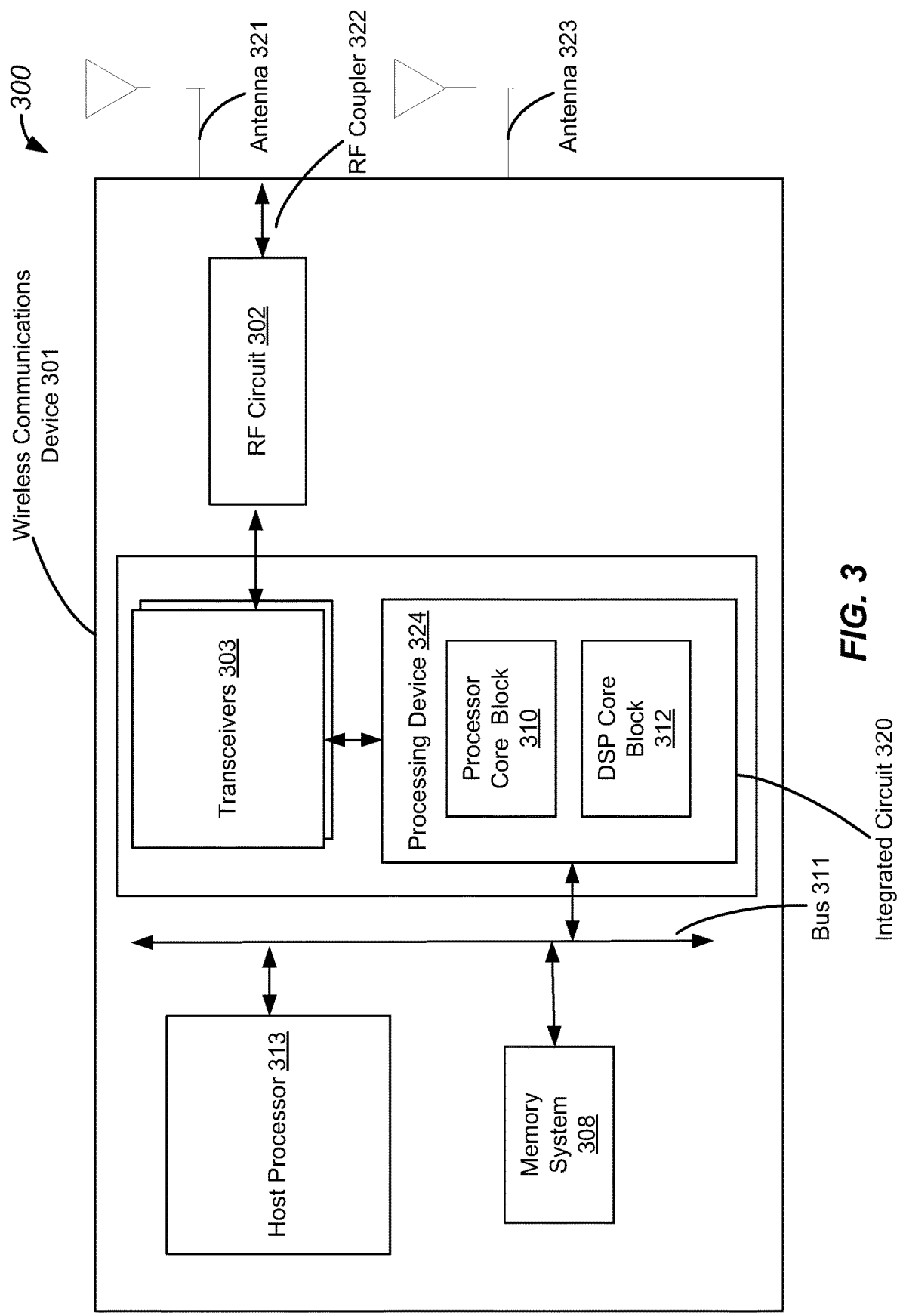
FIG. 3 illustrates an example of a wireless communications device, configured in accordance with some embodiments.

FIG. 3 illustrates an example of a wireless communications device, configured in accordance with some embodiments. More specifically, FIG. 3 illustrates an example of a system, such as system 300, that may include wireless communications device 301. It will be appreciated that wireless communications device 301 may be one of any of first devices 110, second devices 120, source 150, third devices 202, source 210, or source 208. In various embodiments, wireless communications device 301 includes transceivers, such as transceivers 303, which may include transceivers such as transceivers 130 and 132 discussed above. In one example, system 300 includes transceivers 303 configured to transmit and receive signals using a communications medium that may include antenna 321. As noted above, one of transceivers 303 may be included in a Bluetooth radio, and may be compatible with a Bluetooth Low Energy communications protocol. In some embodiments, one of transceivers 303 may be compatible with a Wi-Fi protocol, such as an 802.11ax protocol. Accordingly, transceivers 303 may include components, such as a modulator and demodulator as well as one or more buffers and filters, that are configured to generate and receive signals via antenna 321.

In various embodiments, system 300 further includes processing device 324 which may include logic implemented using one or more processor cores. In various embodiments, processing device 324 includes one or more processing devices that are configured to implement seamless switching operations that will be described in greater detail below. In various embodiments, processing device 324 includes one or more components configured to implement a medium access control (MAC) layer that is configured to control hardware associated with a wireless transmission medium, such as that associated with a Wi-Fi transmission medium. In one example, processing device 324 may include processor core block 310 that may be configured to implement a driver, such as a Bluetooth and/or Wi-Fi driver. Processing device 324 may further include digital signal processor (DSP) core block 312 which may be configured to include microcode.

System 300 further includes radio frequency (RF) circuit 302 which is coupled to antenna 321. It will be appreciated that wireless communications device 301 may have multiple antennas, such as antennas 321 and 323. Accordingly, each of transceivers 303 may use its own antenna, and RF switch 302 may handle switching between antennas. In various embodiments, RF circuit 302 may include various components such as an RF switch, a diplexer, and a filter. Accordingly, RF circuit 302 may be configured to select an antenna for transmission/reception, and may be configured to provide coupling between the selected antenna, such as antenna 321, and other components of system 300 via a bus, such as bus 311.

System 300 includes memory system 308 which is configured to store one or more data values associated with seamless switching operations discussed in greater detail below. Accordingly, memory system 308 includes storage device, which may be a non-volatile random access memory (NVRAM) configured to store such data values, and may also include a cache that is configured to provide a local cache. In various embodiments, system 300 further includes host processor 313 which is configured to implement processing operations implemented by system 300.

It will be appreciated that one or more of the above-described components may be implemented on a single chip, or on different chips. For example, transceivers 303 and processing device 324 may be implemented on the same integrated circuit chip, such as integrated circuit chip 320. In another example, transceivers 303 and processing device 324 may each be implemented on their own chip, and thus may be disposed separately as a multi-chip module or on a common substrate such as a printed circuit board (PCB). It will also be appreciated that components of system 300 may be implemented in the context of a low energy device, a smart device, or a vehicle such as an automobile. Accordingly, some components, such as integrated chip 320, may be implemented in a first location, while other components, such as antenna 321, may be implemented in second location, and coupling between the two may be implemented via a coupler such as RF coupler 322.

Figure 4:
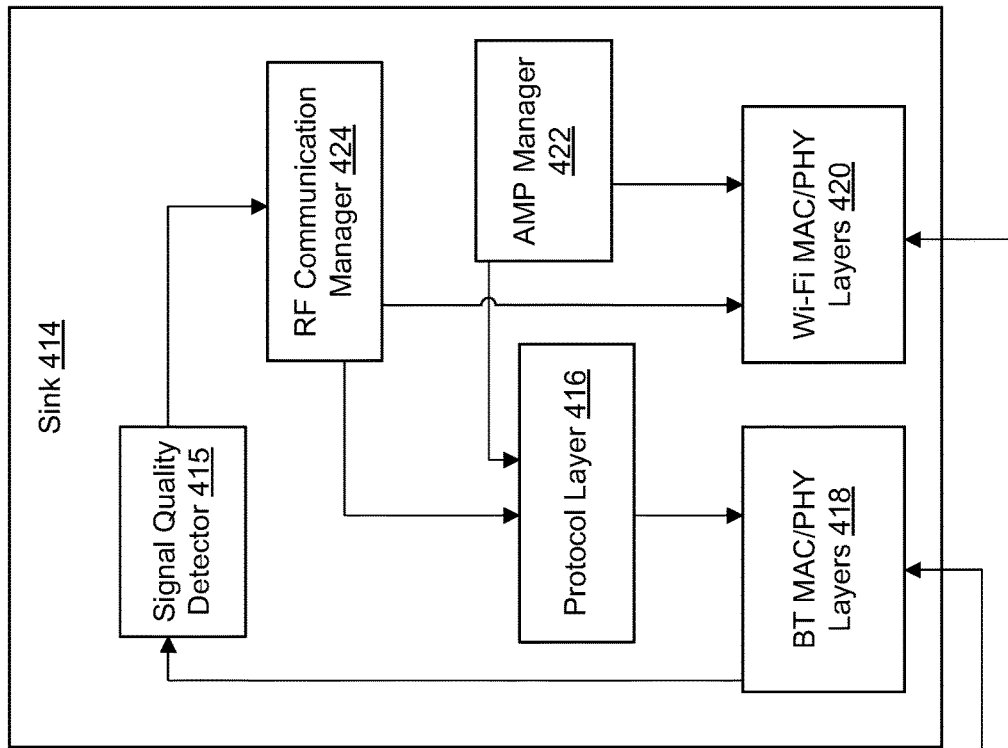
FIG. 4 illustrates an example of yet another system for seamless playback between wireless communications devices, configured in accordance with some embodiments.
Figure 4:
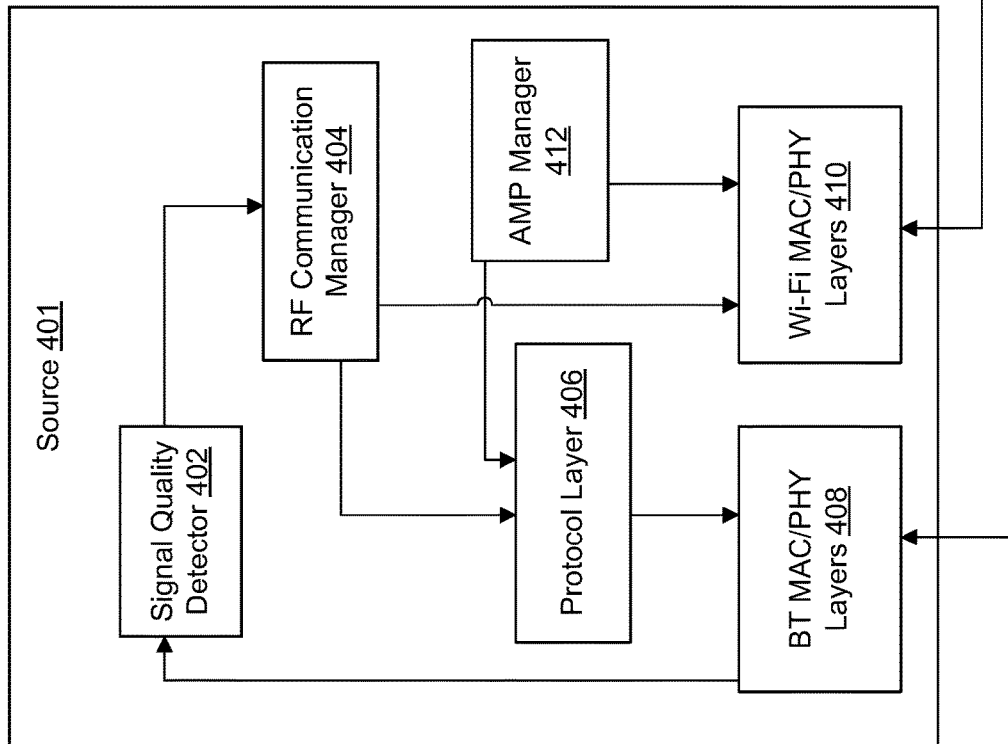

FIG. 4 illustrates an example of yet another system for seamless playback between wireless communications devices, configured in accordance with some embodiments. As previously discussed, wireless communications devices may be configured to implement various seamless switching and playback operations. As shown in FIG. 4, a system, such as system 400, may include various components configured to implement such operations in accordance with an alternate MAC/PHY (AMP) protocol. Accordingly, a source device, such as source device 401, may include various components implemented using a processing device, such as processing device 324 discussed above. Moreover, a sink device, such as sink device 414, may also include various components implemented using a processing device, such as processing device 324 discussed above.

More specifically, source device 401 includes signal quality detector 402 which is configured to obtain signal quality metrics from one or more sources. For example, such signal quality metrics may be received signal strength indicator (RSSI) values. Such quality metrics may be generated periodically, or on a packet-by-packet basis. It will be appreciated that any suitable signal quality metric may be retrieved and used by signal quality detector 402. In some embodiments, such values may be available and retrieved from a BT MAC layer, as will be discussed in greater detail below. Source device 401 further includes RF communication manager 404 which is configured to control profile implementation of a BT stack. Accordingly, RF communication manager 404 may be configured to handle A2DP/AVRCP/RFCOMM transfer of data. Moreover, RF communication manager 404 may also be configured to handle A2DP/AVRCP transfer of data with a Wi-Fi MAC layer, as discussed in greater detail below.

Source device 401 additionally includes protocol layer 406 which is configured to implement logical link control and adaptation protocol. Accordingly, protocol layer may be an L2CAP layer used within a Bluetooth protocol stack. Source device 401 further includes AMP manager 412 which is configured to implement Wi-F discovery and connection operations, as will be discussed in greater detail below. Source device 401 also includes BT MAC/PHY layers 408 which are configured to implement the MAC and PHY layers of a Bluetooth stack. Source device 401 further includes Wi-Fi MAC/PHY layers 410 which are configured to implement the MAC and PHY layers for the Wi-Fi transceiver.

System 400 also includes sink device 414 which is configured to receive streamed data from source device 401. In various embodiments, sink device 414 includes signal quality detector 415 which is configured to obtain signal quality metrics from one or more sources, as discussed above. Sink device 414 further includes RF communication manager 424 which is configured to control profile implementation of a BT stack. Sink device 414 additionally includes protocol layer 416 which is configured to implement logical link control and adaptation protocol. Sink device 414 further includes AMP manager 422 which is configured to implement Wi-F discovery and connection operations. Sink device 414 also includes BT MAC/PHY layers 418 and Wi-Fi MAC/PHY layers 420.

In various embodiments, source device 401 and sink device 414 are configured to seamlessly hand off between Bluetooth and Wi-Fi connections in response to one or more determinations made based on signal quality and/or distance between source device 401 and sink device 414. In system 400, AMP manager 412 and AMP manager 422 may facilitate the process by handling Wi-Fi discovery and connection. Additional details regarding such operations are discussed in greater detail below.

Figure 5:
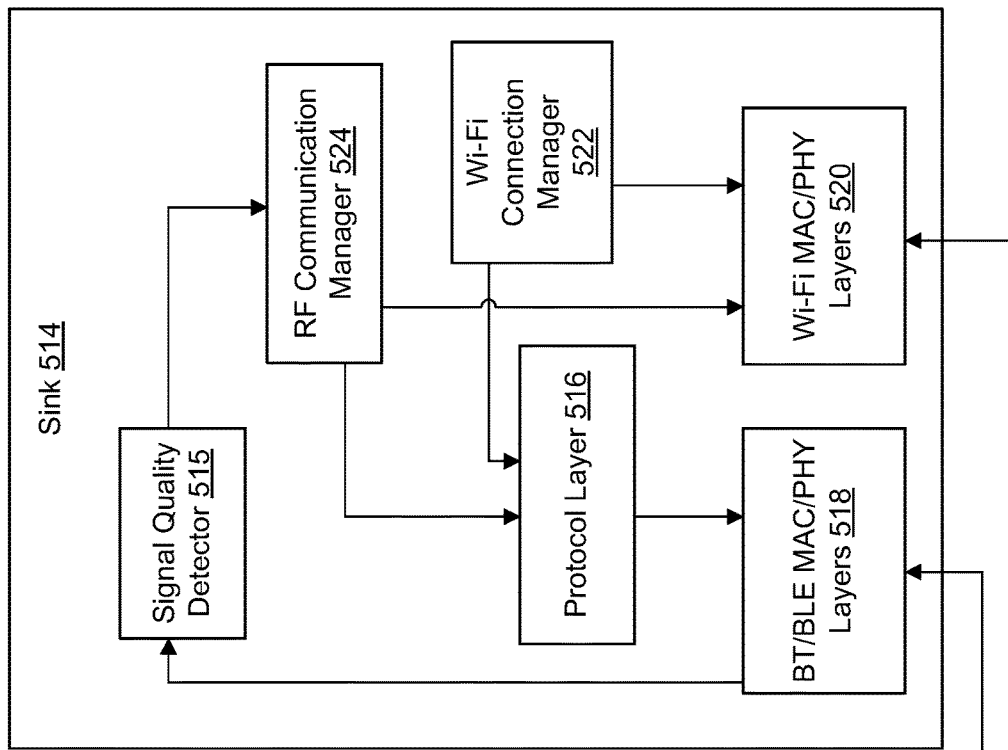
FIG. 5 illustrates an example of an additional system for seamless playback between wireless communications devices, configured in accordance with some embodiments.
Figure 5:
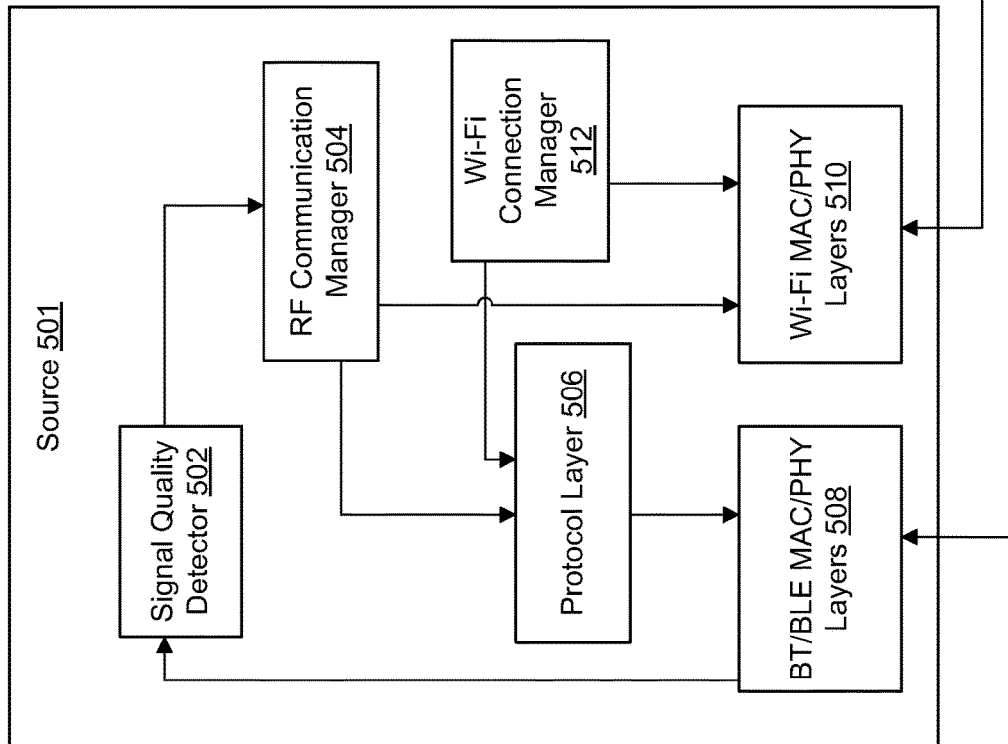

FIG. 5 illustrates an example of an additional system for seamless playback between wireless communications devices, configured in accordance with some embodiments. As previously discussed, wireless communications devices may be configured to implement various seamless switching and playback operations. As shown in FIG. 5, a system, such as system 500, may include various components configured to implement such operations in accordance with a Wi-Fi connection manager. As similarly discussed above, a source device, such as source device 501, may include various components implemented using a processing device, such as processing device 324 discussed above. Moreover, a sink device, such as sink device 514, may also include various components implemented using a processing device, such as processing device 324 discussed above.

As similarly discussed above, source device 501 includes signal quality detector 502, RF communication manager 504, protocol layer 506, BT/BLE MAC/PHY layers 508, and Wi-Fi MAC/PHY layers 510. Accordingly, BT/BLE MAC/PHY layers 508 may include either BT MAC/PHY layers or BLE MAC/PHY layers, but does not need to include both. In various embodiments, source device 501 includes Wi-Fi connection manager 512 which is configured to implement Wi-F discovery and connection operations. Moreover, system 500 includes sink 514 which includes signal quality detector 515, RF communication manager 524, protocol layer 516, BT/BLE MAC/PHY layers 518, and Wi-Fi MAC/PHY layers 520. As similarly discussed above, BT/BLE MAC/PHY layers 518 may include either BT MAC/PHY layers or BLE MAC/PHY layers, but does not need to include both. In various embodiments, sink device 514 includes Wi-Fi connection manager 522 which is configured to implement Wi-F discovery and connection operations. More specifically, Wi-Fi connection manager 522 is configured to discover Wi-Fi radio availability on a peer device using software enabled access point or multicast DNS services, as will be discussed in greater detail below. In various embodiments, Wi-Fi connection manager 522 may also be configured to establish RTP/UDP/IP connections with peer devices as well.

As similarly discussed above, source device 501 and sink device 514 are configured to seamlessly hand off between Bluetooth and Wi-Fi connections in response to one or more determinations made based on signal quality and/or distance between source device 501 and sink device 514. In system 500, Wi-Fi connection manager 512 and Wi-Fi connection manager 522 may facilitate the process by handling Wi-Fi discovery and connection. Additional details regarding such operations are discussed in greater detail below.

Figure 6:
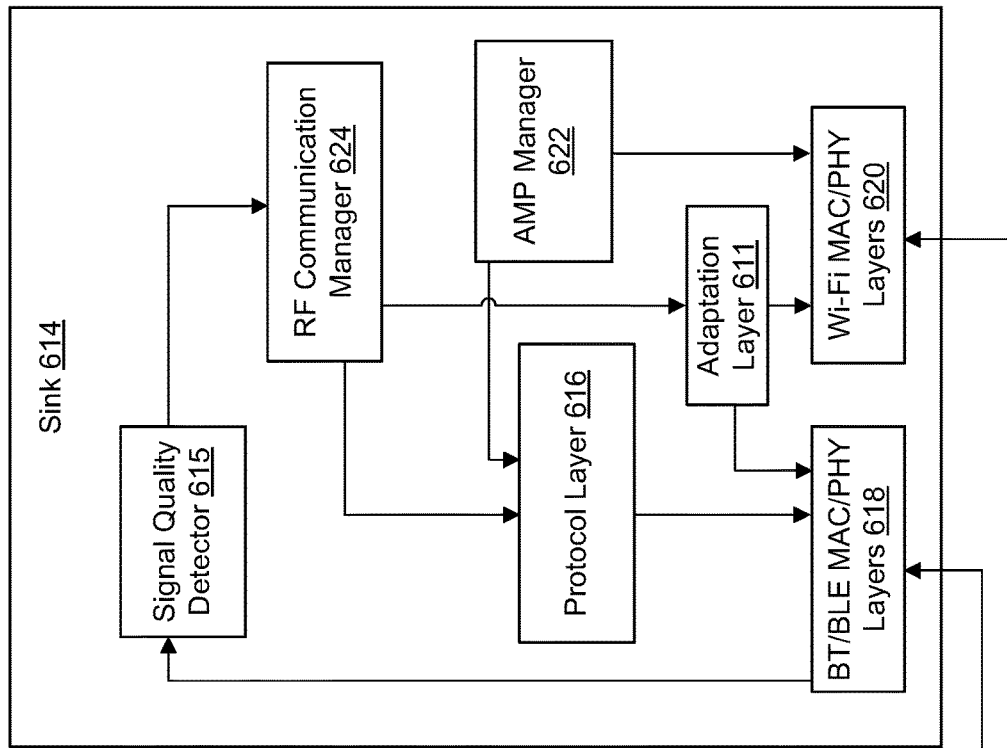
FIG. 6 illustrates an example of another system for seamless playback between wireless communications devices, configured in accordance with some embodiments.
Figure 6:
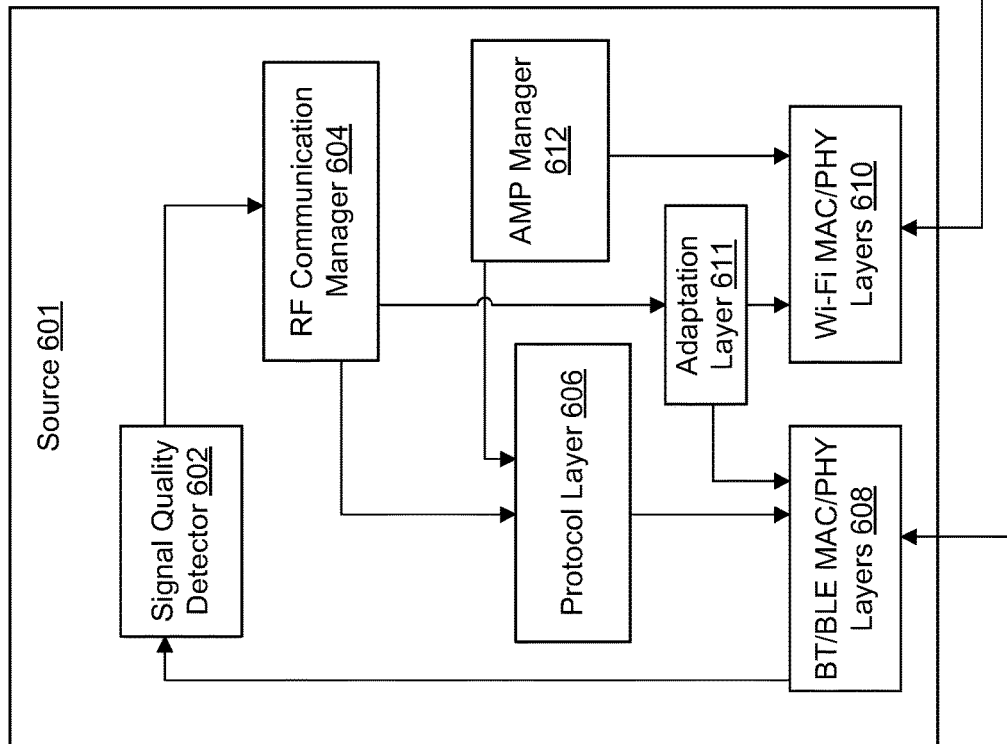

FIG. 6 illustrates an example of another system for seamless playback between wireless communications devices, configured in accordance with some embodiments. As previously discussed, wireless communications devices may be configured to implement various seamless switching and playback operations. As shown in FIG. 6, a system, such as system 600, may include various components configured to implement such operations in accordance with a Bluetooth Low Energy protocol. As similarly discussed above, a source device, such as source device 601, may include various components implemented using a processing device, such as processing device 324 discussed above. Moreover, a sink device, such as sink device 614, may also include various components implemented using a processing device, such as processing device 324 discussed above.

As similarly discussed above, source device 601 includes signal quality detector 602, RF communication manager 604, protocol layer 606, Wi-Fi MAC/PHY layers 610, and AMP manager 612. In various embodiments, source device 601 includes BT/BLE MAC/PHY layers 608 which are configured to implement MAC and PHY layers of a BT and a BLE stack. Accordingly, BT/BLE MAC/PHY layers 608 may include MAC and PHY layers for both BT and BLE. Moreover, source device 601 further includes adaptation layer 611 which is configured to perform data unit conversion, as may be appropriate for synchronous channel function. Moreover, system 600 includes sink device 614 which includes signal quality detector 615, RF communication manager 624, protocol layer 616, and Wi-Fi MAC/PHY layers 620. In various embodiments, sink device 614 includes BT/BLE MAC/PHY layers 618 which are configured to implement MAC and PHY layers of a BT and a BLE stack. As similarly discussed above, BT/BLE MAC/PHY layers 618 may include MAC and PHY layers for both BT and BLE. Moreover, sink device 614 further includes adaptation layer 611 which is configured to perform data unit conversion.

Accordingly, as shown in FIG. 6, embodiments disclosed herein may be implemented in the context of Bluetooth Low Energy devices. Thus, seamless handoffs may be implemented between BLE and Wi-Fi transceivers, and thus may accomplish seamless transmission of data that may be, for example, the playback of streamed audio files, as will be discussed in greater detail below.

Figure 7:
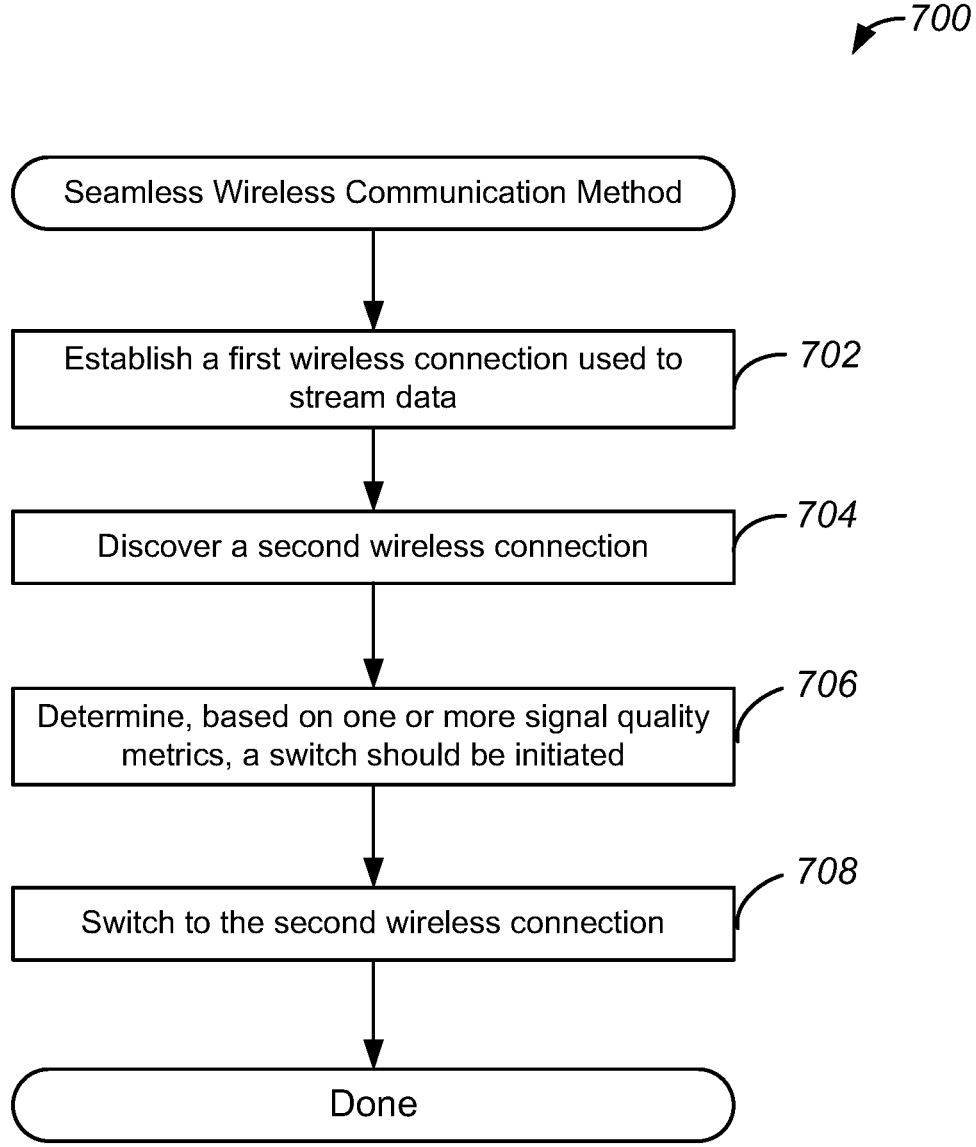
FIG. 7 illustrates a flow chart of an example of a method for seamless playback between wireless communications devices, implemented in accordance with some embodiments.

FIG. 7 illustrates a flow chart of an example of a method for seamless playback between wireless communications devices, implemented in accordance with some embodiments. As discussed above, wireless communications devices may be configured to seamlessly switch between wireless connection modalities to compensate for changes in distances and/or signal quality between the source and sink devices, thus ensuring seamless playback of the audio file despite such changes in distance. As will be discussed in greater detail below, a method, such as method 700, may be implemented to manage different wireless connections and facilitate the seamless switching between such wireless connections when appropriate.

Method 700 may commence with operation 702, during which a first wireless connection may be established. In various embodiments, the first wireless connection may be a wireless connection that is initially used to transmit data between devices, such as a source and a sink device. In one example, this may be a Bluetooth connection between a mobile device and a wireless headset, where the mobile device is streaming music to the wireless headset via the Bluetooth connection.

Method 700 may proceed to operation 704, during which a second wireless connection may be discovered. In various embodiments, the second wireless connection between the source and sink device may be discovered via one or more discovery operations. As discussed above, the second wireless connection may be a Wi-Fi connection. Moreover, during operation 704, the second wireless connection may be set to a power save mode.

Method 700 may proceed to operation 706, during which it may be determined if a switch should be made. Accordingly, one of the devices, such as the source device, may identify one or more switch parameters that indicate that a switch should be made. For example, the switch parameters may identify one or more conditions that trigger or initiate a switch between wireless connections. In one example, the conditions may include a drop in a quality of a signal of a wireless connection. The conditions may also include an increase or a decrease in a determined distance between devices. In this way, various characteristics of data transmission may be used to determine switch parameters, and identify when a switch between wireless connections should be implemented.

Method 700 may proceed to operation 708, during which a switch may be made to the second wireless connection. Accordingly, in response to determining that a switch should be made, the source and sink devices may switch to using the second wireless connection. As will be discussed in greater detail below, one or more synchronization operations may be implemented to ensure that the switch is seamless.

Figure 8:
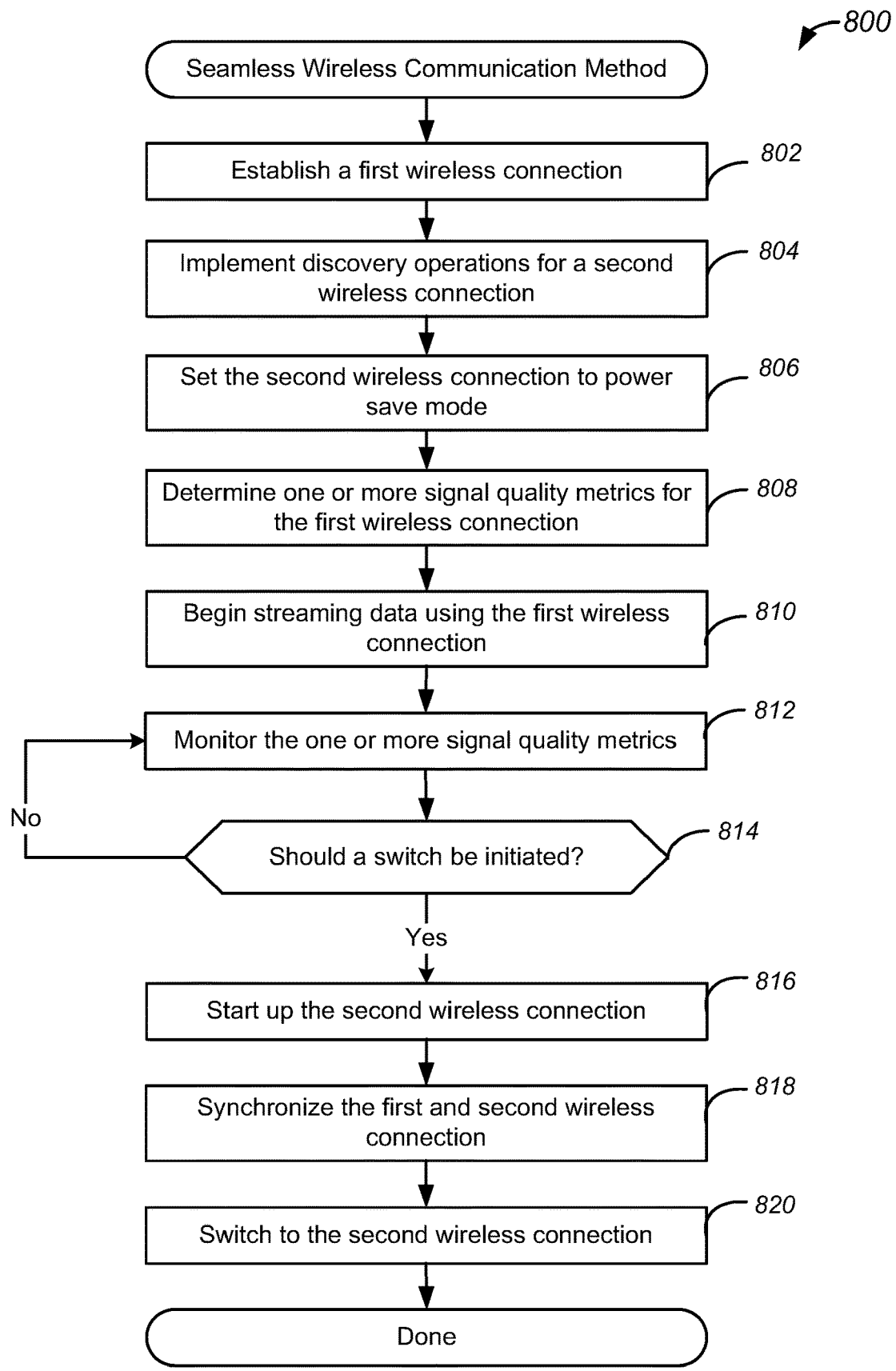
FIG. 8 illustrates a flow chart of an example of another method for seamless playback between wireless communications devices, implemented in accordance with some embodiments.

FIG. 8 illustrates a flow chart of an example of another method for seamless playback between wireless communications devices, implemented in accordance with some embodiments. As discussed above, wireless communications devices may be configured to seamlessly switch between wireless connection modalities to compensate for changes in distances and/or signal quality between the source and sink devices. As will be discussed in greater detail below, a method, such as method 800, may be implemented to manage different wireless connections and facilitate the seamless switching between such wireless connections when appropriate.

Method 800 may commence with operation 802 during which a first wireless connection may be established. As similarly discussed above, the first wireless connection may be a wireless connection that is initially used to transmit data between devices, such as a source and a sink device. As previously discussed, the first wireless connection may be a Bluetooth connection between a mobile device and a wireless headset, where the mobile device is configured to stream music to the wireless headset via the Bluetooth connection. Accordingly, during operation 802, a Bluetooth connection may be established between the source and sink devices in preparation for streaming of an audio file from the source device to the sink device over the Bluetooth connection.

Method 800 may proceed to operation 804 during which one or more discovery operations may be implemented for a second wireless connection. As discussed above, the second wireless connection between the source and sink device may be a Wi-Fi connection. Accordingly, the second wireless connection may be discovered via one or more discovery operations that may be implemented by one or more components of the source device. For example, the discovery operations may be implemented by an AMP manager of the source device. In another example, the discovery operations may be implemented by a Wi-Fi connection manager included in the source device. In various embodiments, the discovery operations are used to complete device identification and connection establishment. Accordingly, as part of the discovery, a communications link may be established for the second wireless connection. Additional details regarding various different discovery modalities are discussed in greater detail below.

Method 800 may proceed to operation 806 during which the second wireless connection may be set to a power save mode. Accordingly, one of the devices, such as the sink device, may set the second wireless connection to a power save mode to save power while not in use. For example, if the first wireless connection is a Bluetooth connection that is to be used for streaming of audio data, and the second wireless connection is Wi-Fi connection that is not going to be used in the immediate future, the second wireless connection may be set to a power save mode to reduce power consumption while not in use.

Method 800 may proceed to operation 808 during which one or more signal quality metrics may be determined for the first wireless connection. As discussed above, the signal quality metrics may include metrics such as RSSI values. Such metrics may be determined by one or more components of the devices, such as MAC/PHY layers of the source device. Accordingly, RSSI values may be determined for the first wireless connection using hardware, such as a processing device, supporting the first wireless connection.

It will be appreciated that other signal quality metrics may be used as well, such as aspects of channel coherence. In various embodiments, signal quality metrics may be computed based on such retrieved values. For example, an amount or a rate of change of an RSSI value may be used as a signal quality metric. In various embodiments, the signal quality metrics may include one or more packet loss values that identify an amount and/or rate of packet loss in a wireless connection. Moreover, the signal quality metrics may also include bit error rate values that identify an amount or rate of bit errors experienced by the sink device. Such values may be reported by one or more devices, such as a sink device. Such values may also be inferred from transmission events, such as data retransmissions. In some embodiments, a bit error rate value may be estimated based on one or more other metrics, such as an RSSI value, a bit reliability value, and/or an estimated distance.

In some embodiments, the signal quality metric may be computed based on combinations of metrics and/or measurements. For example, a combination of an RSSI value and a measured power may be used to infer a distance between the source and sink device. For example, an equation, such as equation 1 shown below, may be used to estimate a distance.

$$\text{Distance} = 10 \wedge \left(\text{Measured Power} - \frac{RSSI}{10*N}\right) \quad (1)$$

In equation 1, N may be a configurable constant set to a designated or predetermined value based on one or more calibration operations. In various embodiments, the distance may also be estimated using a high accuracy distance measurement (HADM) which may be available in, for example, Bluetooth Low Energy contexts. Moreover, other metrics may be used as well, such as one or more measures of packet loss. For example, a number of retransmissions may be monitored and used to identify instances of packet loss. As will be discussed in greater detail below, such a monitored number may be compared against a predetermined threshold to trigger a switch. It will be appreciated that incidents of packet loss may also be averaged over time, and if a rate of packet loss exceeds a permissible threshold, a switch may be triggered. In this way, the devices may be configured to infer a distance between the source and sink device, and the inferred distance may be used as the signal quality metric. Additional details regarding the use of such signal quality metrics are discussed in greater detail below.

Method 800 may proceed to operation 810 during which data may be streamed using the first wireless connection. Accordingly, during operation 810, one or more components of the source device may cause the transmission of data over the first wireless connection. For example, an application executed on a mobile device may cause the transmission and streaming of an audio file so that it may be played by the sink device. The streamed data is transmitted from the source device to the sink device as a data stream that is packetized in accordance with the transmission protocol of the first wireless connection. It will be appreciated that the source and sink device may be any suitable Bluetooth-capable source and sink devices.

Method 800 may proceed to operation 812 during which the one or more signal quality metrics may be monitored. Accordingly, one or more of the devices, such as the source device, may periodically measure and/or compute the one or more signal quality metrics. Moreover, the monitored metrics may be stored in a memory device.

Method 800 may proceed to operation 814 during which it may be determined if a switch should be initiated. As similarly discussed above, such a determination may be made based on one or more switch parameters that indicate that a switch should be made. Accordingly, the switch parameters may identify specific conditions that indicate when a switch should be initiated. For example, the switch conditions may identify a threshold value for an RSSI value. In this example, a drop below the threshold RSSI value for the first wireless connection may trigger a switch. In another example, a drop below the threshold RSSI value for the first wireless connection and an increase above a threshold RSSI value for the second wireless connection may trigger a switch. Thus, combinations of different metrics may be used. Furthermore, a designated distance may be used as a switch parameter. For example, if an inferred distance between the source and sink devices increases above a threshold, a switch may be triggered. In various embodiments, other metrics may be used as well, such as a measure of a rate of packet loss. Moreover, a HADM value may be used as well. Further still, additional metrics, such as reliability metrics may be used. For example, a magnitude error or a phase error obtained from one or more components of a transceiver, such as a modulator and/or demodulator, may be used to infer bit reliability and signal quality. Accordingly, during operation 814, a determination may be made based on a comparison of the monitored signal quality metrics and the switch parameters. If it is determined that a switch should not be initiated, method 800 may return to operation 812. If it is determined that a switch should be initiated, method 800 may proceed to operation 816.

Accordingly, during operation 816 the second wireless connection may be started. Thus, in response to determining that the switch should be made, the second wireless connection may be removed from a power save mode and returned to an active mode, and the second wireless connection may be made ready for data transmission and reception.

Method 800 may proceed to operation 818 during which the first wireless connection and the second wireless connection may be synchronized. Accordingly, during operation 818, the data being streamed over the first wireless connection may also be streamed over the second wireless connection to implement simultaneous and redundant streaming of the data on both the first and second wireless connections.

As discussed above, this may be the simultaneous streaming of an audio file from the source device to the sink device on both the Bluetooth and the Wi-Fi connection at the same time. In various embodiments, the sink device may implement one or more synchronization operations to synchronize the received streams. Such synchronization operations may timestamp alignment, or any other suitable synchronization operations. For example, timestamps may be extract from header information, such as A2DP, IOSAL, or RTP headers. Such timestamps may be used to align data packets received from different wireless connections. Moreover, the timestamps may be used to identify and drop duplicate and redundant data packets. More specifically, data packets having a same timestamp may be identified as duplicates. The sink device may also use the timestamps to ensure that there is no gap in the timestamps, thus providing seamless switching and gap-free playback of a streamed audio file.

Method 800 may proceed to operation 820 during which the switch may be made to the second wireless connection. Accordingly, in response to determining that a switch should be made, the source and sink devices may switch to using the second wireless connection. In various embodiments, the source device and sink device may implement data encapsulation customized to facilitate the seamless switching. For example, the source device may encapsulate the data packets such that A2DP data packets originally being sent over the Bluetooth connection are encapsulated and sent over the Wi-Fi connection. In this way, the data packets may be received at the source device and processed by a downstream component, such as an application, in a manner that is transparent to the application.

It will be appreciated that once the switch is complete, the first network connection may be put in a power save mode or stopped, and duplicate stream data may be discarded. Moreover, while method 800 describes the switch from the first network connection to the second network connection, the opposite may also be accomplished. For example, a switch may be made from a Wi-Fi connection to a Bluetooth connection in response to a determination made based on one or more signal quality metrics. It will also be appreciated that audio/video remote control profile (AVRCP) commands may also be sent in the streamed audio data via whichever wireless connection is in use. For example, if the Wi-Fi connection is being used, AVRCP commands may be packetized, encapsulated, and sent to the sink device. Such commands would be received by the sink device in a manner that is transparent to downstream components and applications of the sink device.

Figure 9:
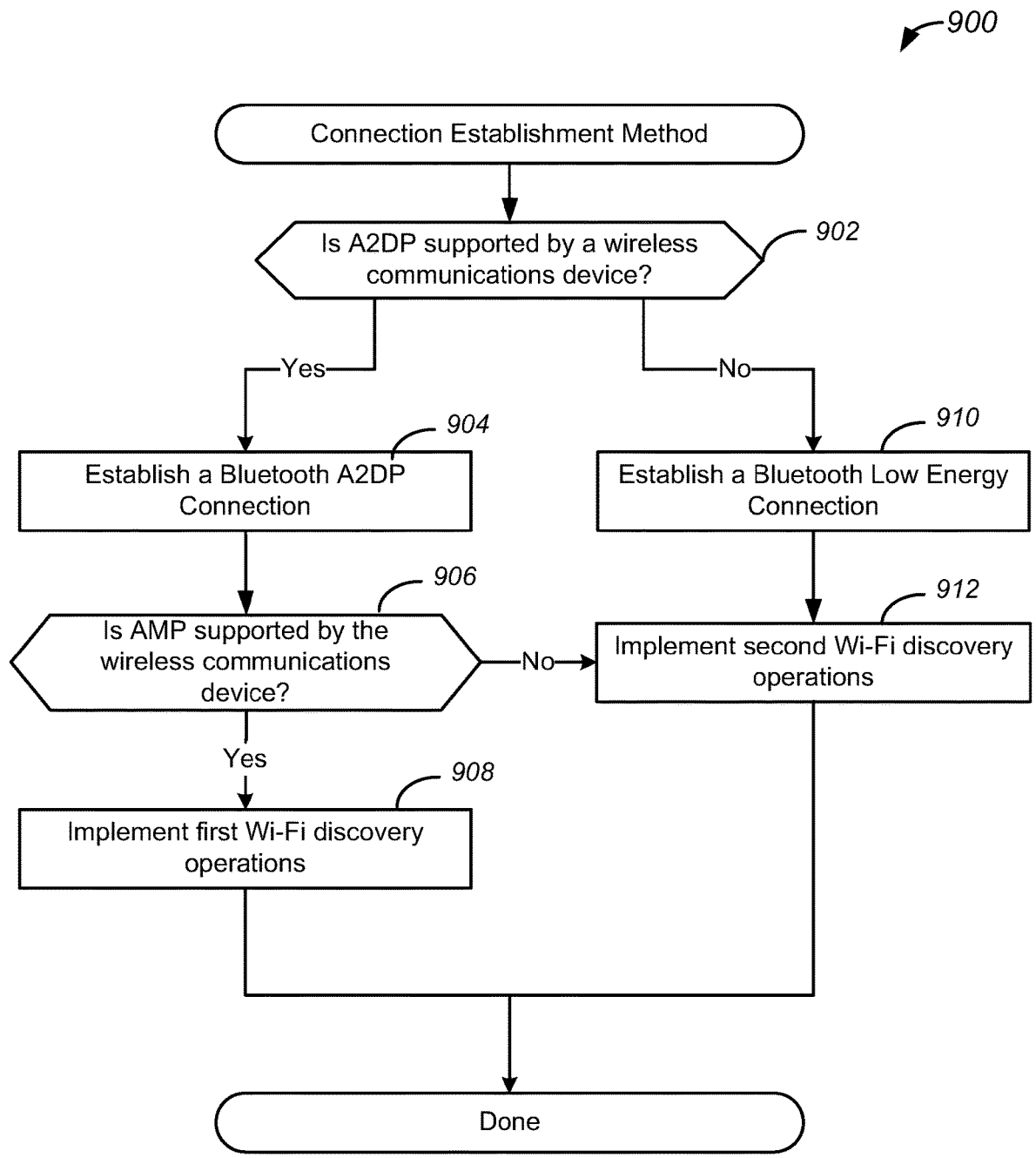
FIG. 9 illustrates a flow chart of an example of a method for connection establishment between wireless communications devices, implemented in accordance with some embodiments.

FIG. 9 illustrates a flow chart of an example of a method for connection establishment between wireless communications devices, implemented in accordance with some embodiments. As discussed above, source devices and sink devices may implement various different operations for the purposes of establishing wireless connections. Thus, according to various embodiments, a method, such as method 900, may be implemented to establish a first wireless connection that may be a Bluetooth connection, as discussed above.

Method 900 may commence with operation 902 during which it may be determined if a designated Bluetooth protocol is supported by both the source and sink devices. In various embodiments, such a determination may be made based on one or more interactions between the source and sink devices. For example, the source device may query the sink device to determine its capabilities. In one example, it may be determined if the source device and the sink device both support an A2DP Bluetooth protocol. If it is determined that they do support the designated Bluetooth protocol, method 900 may proceed to operation 904.

Accordingly, during operation 904 a Bluetooth connection may be established. As discussed above, the designated Bluetooth protocol may be an A2DP Bluetooth protocol. Accordingly, during operation 904, an A2DP connection may be established between the source device and the sink device.

Method 900 may proceed to operation 906 during which it may be determined if AMP is supported by the wireless communications devices. As similarly discussed above, such a determination may be made by querying the device's capabilities and determining if both the source device and the sink device support AMP. If it is determined that AMP is supported, method 900 may proceed to operation 908 during which first Wi-Fi discovery operations may be implemented, as discussed in greater detail below with reference to FIG. 10. If it is determined that AMP is not supported, method 900 may proceed to operation 912 during which second Wi-Fi discovery operations may be implemented, as will be discussed in greater detail below with reference to FIG. 11.

Returning to operation 902, if it is determined that designated Bluetooth protocol is not supported, then method 900 may proceed to operation 910 during which a connection may be established in accordance with another Bluetooth protocol may be implemented. For example, if it is determined that the sink device does not support A2DP, a Bluetooth Low Energy connection may be established, and method 900 may then proceed to operation 912 discussed above.

Figure 10:
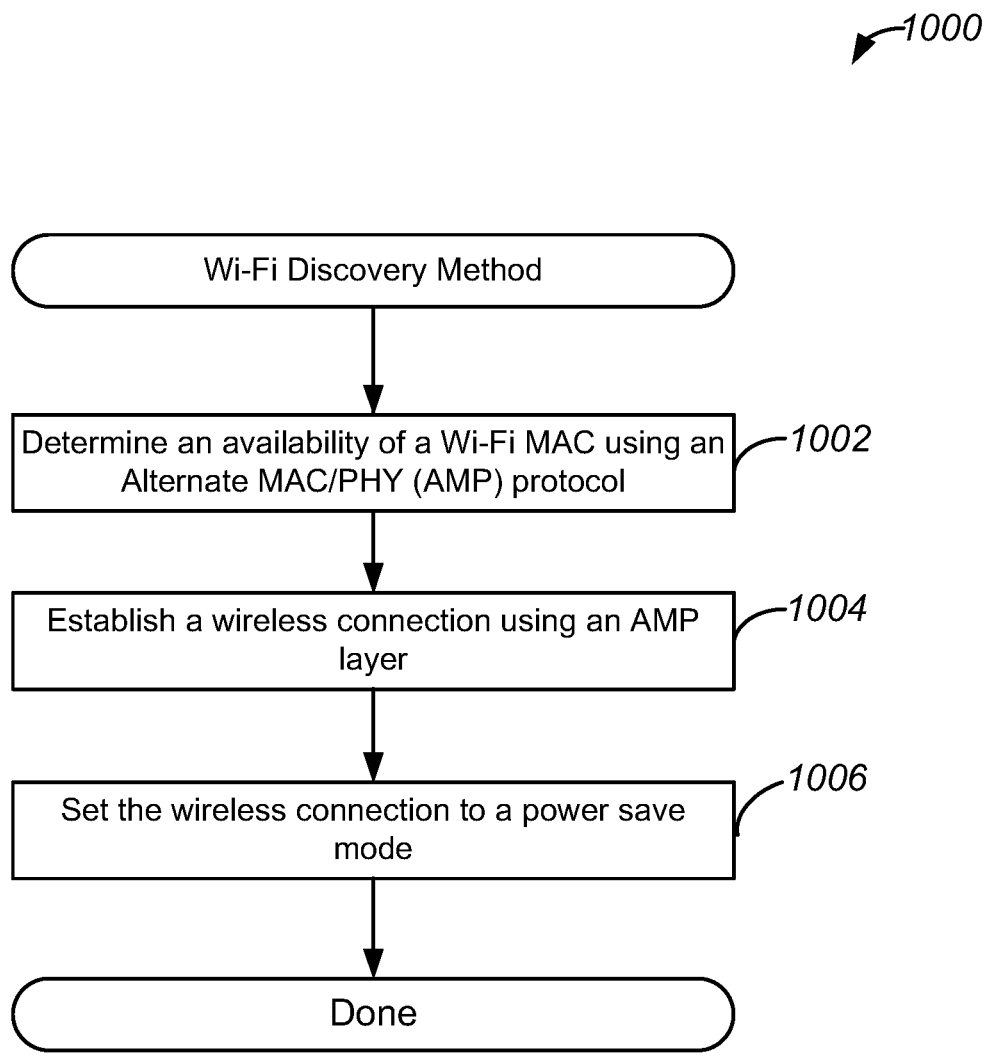
FIG. 10 illustrates a flow chart of an example of a method for Wi-Fi discovery, implemented in accordance with some embodiments.

FIG. 10 illustrates a flow chart of an example of a method for Wi-Fi discovery, implemented in accordance with some embodiments. As discussed above, source device and sink devices may implement various different operations for the purposes of establishing wireless connections. Thus, according to various embodiments, a method, such as method 1000, may be implemented to establish a second wireless connection in accordance with first Wi-Fi discovery operations, as discussed above.

Method 1000 may commence with operation 1002 during which an availability of a Wi-Fi MAC may be determined. Accordingly, as similarly discussed above, an AMP manager of a source device may query a sink device to determine its Wi-Fi availability. More specifically, the Wi-Fi MAC may be queried, and it may be determined if the sink device is available to establish a wireless connection. In various embodiments, confirmation of availability may be provided in a return message to the source device.

Method 1000 may proceed to operation 1004 during which a wireless connection may be established. Accordingly, the AMP manager may facilitate the establishment of the Wi-Fi connection between the source device and the sink device, and based on the Wi-Fi MAC availability. In this way, a Wi-Fi connection may be established between the source device and the sink device.

Method 1000 may proceed to operation 1006 during which the wireless connection may be set to a power save mode. As discussed above, if not active, the wireless connection may be set to a power save mode to conserve power. As also discussed above, the wireless connection may be removed from a power save mode when it is determined that a switch to the wireless connection is to occur.

Figure 11:
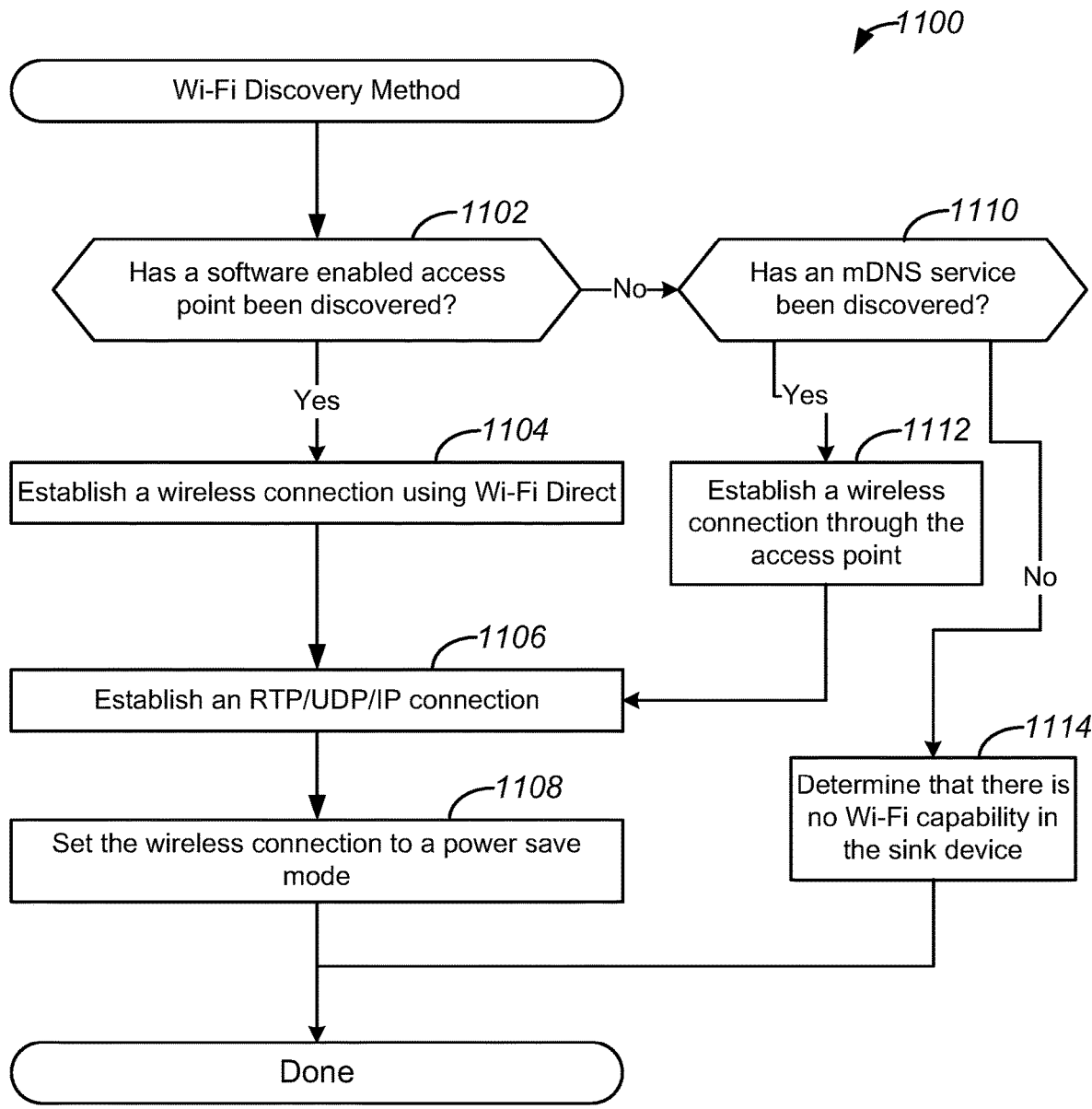
FIG. 11 illustrates a flow chart of an example of another method for Wi-Fi discovery, implemented in accordance with some embodiments.

FIG. 11 illustrates a flow chart of an example of another method for Wi-Fi discovery, implemented in accordance with some embodiments. As discussed above, source device and sink devices may implement various different operations for the purposes of establishing wireless connections. Thus, according to various embodiments, a method, such as method 1100, may be implemented to establish a second wireless connection in accordance with second Wi-Fi discovery operations, as discussed above.

Method 1100 may commence with operation 1102 during which it may be determined if a software enabled access point has been discovered. In various embodiments, one or more devices may be configured to support software enabled access point (SoftAP) functionalities. Accordingly, during operation 1102, a source device may determine if the sink device supports SoftAP. If it is determined that the sink device does support SoftAP, method 1100 may proceed to operation 1104.

Accordingly, during operation 1104, a wireless connection may be established via Wi-Fi Direct. Thus, a Wi-Fi connection may be established between the source device and the sink device using a direct peer-to-peer connection provided by the Wi-Fi Direct configuration.

Method 1100 may proceed to operation 1106 during which an RTP/UDP/IP connection may be established. Accordingly, during operation 1106, a network connection may be established to facilitate the transport of audio data over a network. In various embodiments, the connection may be a real-time transport protocol (RTP) connection, a user datagram protocol (UDP) connection, or an internet protocol (IP) connection. Any suitable network protocol may be used.

Method 1100 may proceed to operation 1108 during which the wireless connection may be set to a power save mode. As discussed above, the wireless connection may be set to the power save mode to conserve power if not in use. In some embodiments, the wireless connection may be set to the power save mode by the sink device.

Returning to operation 1102, if it is determined that a software enabled access point has not been discovered, method 1100 may proceed to operation 1110 during which if may be determined if a multicast DNS (mDNS) service has been discovered. In various embodiments, such a determination may be made by the source device based on a query of the sink device. If it is determined that an mDNS service has been discovered, method 1100 may proceed to operation 1112 during which a wireless connection may be established through an access point. Accordingly, a Wi-Fi connection may be established via an access point implemented via the mDNS service.

Returning to operation 1110, if it is determined that an mDNS service has not been discovered, method 1100 may proceed to operation 1114 during which it may be determined that there is no Wi-Fi capability in the sink device. Upon making such determination, method 1100 may terminate.

Figure 12:
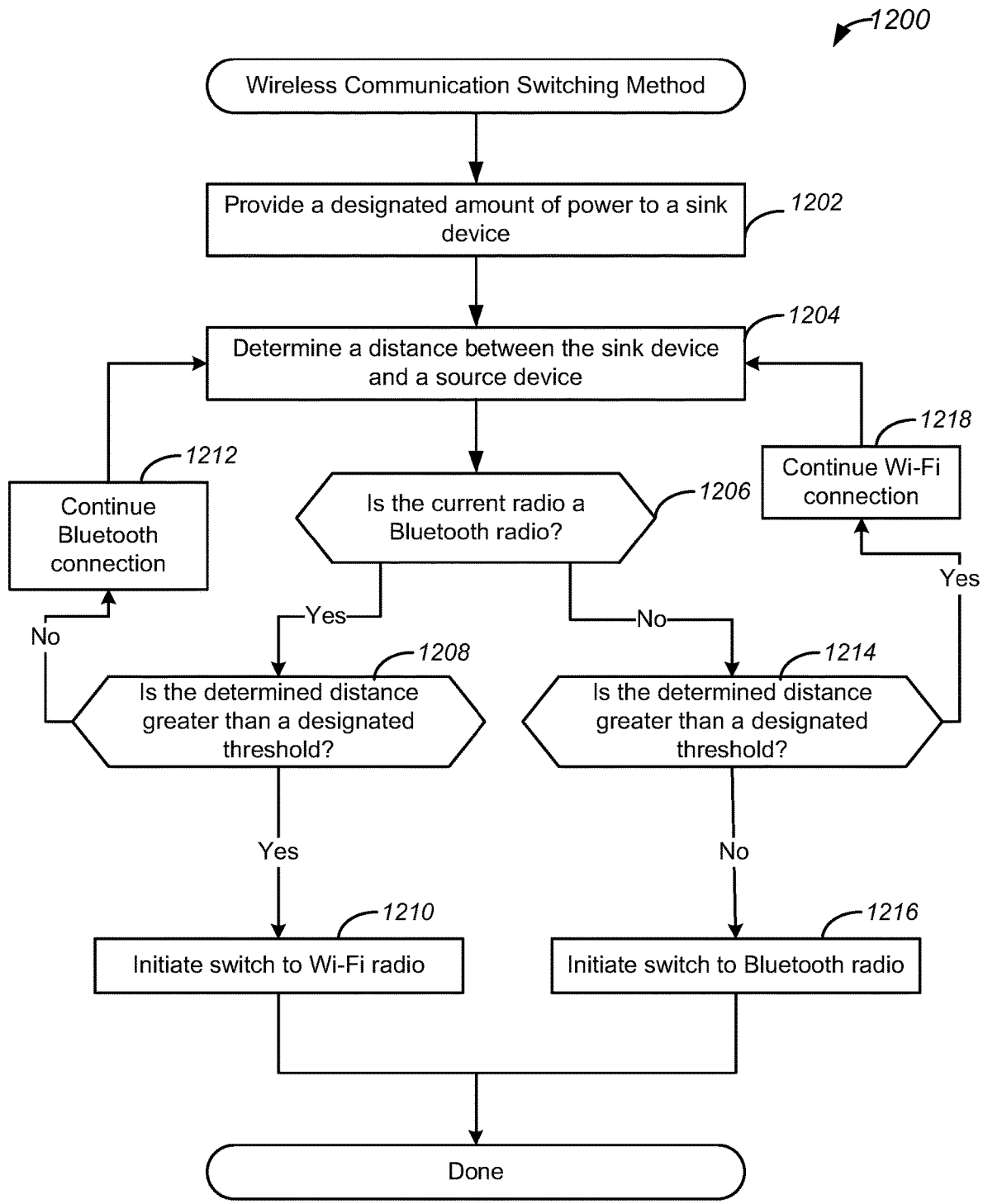
FIG. 12 illustrates a flow chart of an example of a method for seamless switching, implemented in accordance with some embodiments.

FIG. 12 illustrates a flow chart of an example of a method for seamless switching, implemented in accordance with some embodiments. As discussed above, a determination of whether or not a switch between network connections should be made may be based on various parameters and metrics, such as switch parameters and signal quality metrics. Thus, according to various embodiments, a method, such as method 1200, may be implemented to determine a switch should be made and initiate the switch, as discussed above.

Method 1200 may commence with operation 1202 during which a designated amount of power may be provided to a sink device. In various embodiments, the designated amount of power may be a quantity that is known to both the source device and the sink device, and may have been determined during an initial configuration of the devices, or during connection establishment. The designated amount of power may be a specified transmission power that is to be used by the source device.

Method 1200 may proceed to operation 1204 during which a distance between the sink device and a source device may be determined. Accordingly, as similarly discussed above, the known power and a measured RSSI value may be used to generate an estimated distance between the source device and the sink device. As also discussed above, a HADM value may be used as well. Moreover, measures of packet loss may also be used. As discussed above, techniques such as A2DP may support retransmission that will retransmit data packets without limit. If a source device retransmits for too long, the sink device may underrun its playout buffer, and the sink device may use one or more packet loss concealment techniques which will result in poor performance. Accordingly, as discussed above, the number of retransmissions may be monitored and may be used as a metric instead of an estimated distance.

Method 1200 may proceed to operation 1206 during which it may be determined if a current radio is a Bluetooth radio. In various embodiments, the source device may query one or more components, such as RF connection managers or other components of the Bluetooth and Wi-Fi radios, to determine which radio and associated transceiver is currently selected. If it is determined that the Bluetooth radio is currently selected, method 1200 may proceed to operation 1208.

Accordingly, during operation 1208, it may be determined if the determined distance is greater than a designated threshold. If it is determined that the determined distance is not greater than the designated threshold, method 1200 may proceed to operation 1212 during which the Bluetooth connection may be continued. If it is determined that the determined distance is greater than the designated threshold, method 1200 may proceed to operation 1210 during which a switch from the Bluetooth radio to the Wi-Fi radio may be initiated, as will be discussed in greater detail below with reference to FIG. 13.

Returning to operation 1206, if it is determined that the Bluetooth radio is not the current radio, method 1200 may proceed to operation 1214 during which it may be determined if the determined distance is greater than a designated threshold. If it is determined that the determined distance is greater than the designated threshold, method 1200 may proceed to operation 1218 during which the Wi-Fi connection may be continued. If it is determined that the determined distance is not greater than the designated threshold, method 1200 may proceed to operation 1216 during which a switch from the Wi-Fi radio to the Bluetooth radio may be initiated, as will be discussed in greater detail below with reference to FIG. 14.

While operations 1208 and 1214 are discussed with reference to a determined distance, embodiments disclosed herein contemplate the use of additional metrics also disclosed herein. For example, instead of a determined distance, another metric, such as a metric of data packet loss may be used. Accordingly, operation 1208 and operation 1214 may instead view a determined metric of packet loss, and compare the metric of packet loss with a designated threshold value.

Figure 13:
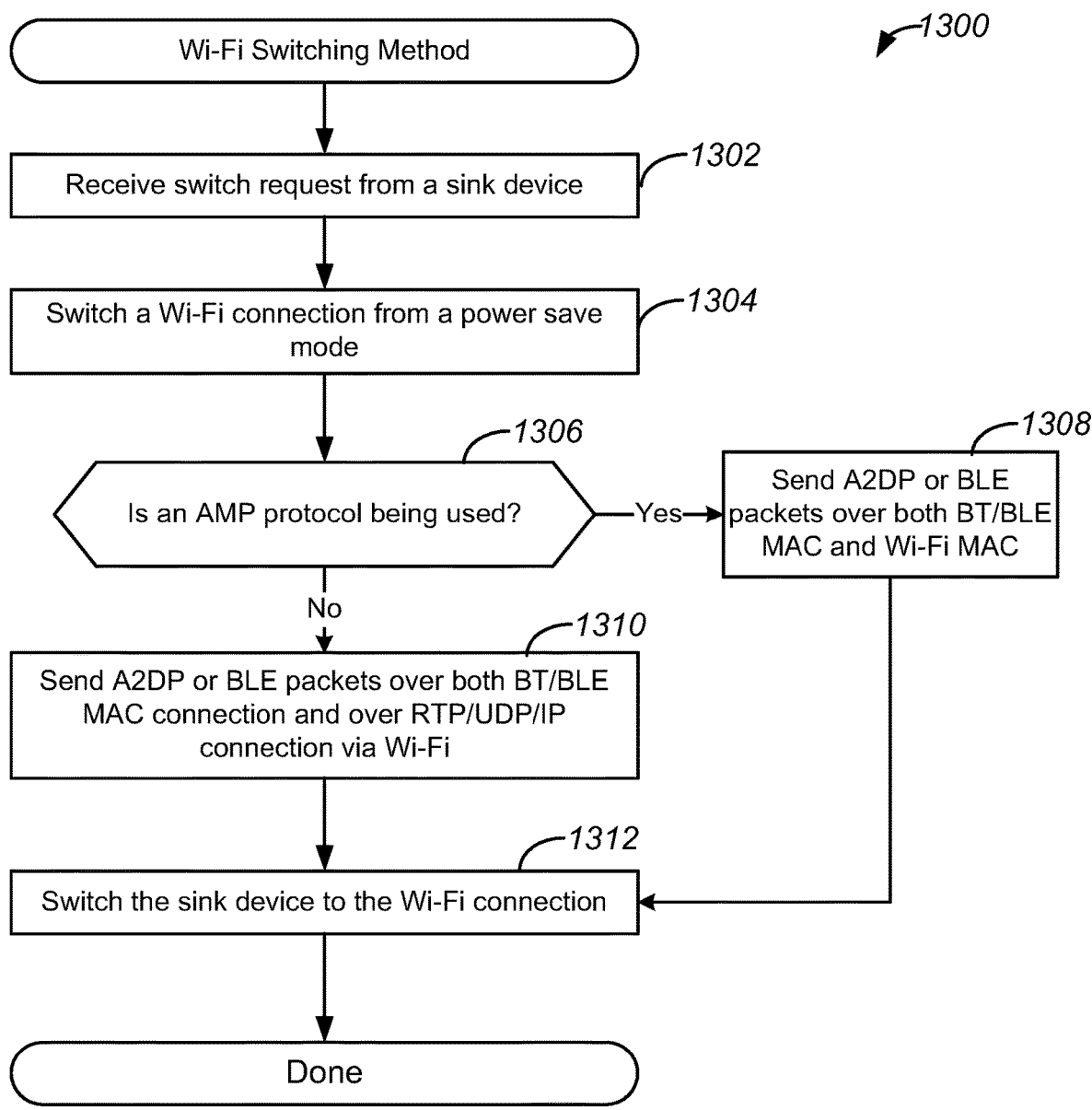
FIG. 13 illustrates a flow chart of an example of a method for Wi-Fi switching, implemented in accordance with some embodiments.

FIG. 13 illustrates a flow chart of an example of a method for Wi-Fi switching, implemented in accordance with some embodiments. As discussed above, a determination may be made to switch from a Bluetooth radio to a Wi-Fi radio. Thus, according to various embodiments, a method, such as method 1300, may be used to implement the switch in accordance with the capabilities of the source device and the sink device, as discussed above. Moreover, the switch operations may be dynamically customized based on capabilities of the devices, such dynamically determining a type of connection used, and a configuration of encapsulation used.

Method 1300 may commence with operation 1302 during which a request to implement a switch may be received from a sink device. In various embodiments, the request may be made to indicate that the sink device is ready for the switch, and the source device may proceed to initiate the switch. Operations underlying the determination to make the switch have been previously discussed above.

Method 1300 may proceed to operation 1304 during which a wireless connection may be switched from a power save mode. Thus, according to various embodiments, during operation 1304, a Wi-Fi connection may be switched from a power save mode so that the connection is ready to be used.

Method 1300 may proceed to operation 1306 during which it may be determined if an AMP protocol is being used. In various embodiments, such a determination may be made based on capabilities of the sink device as well as the source device, and may be made based on a query of hardware of such devices, as discussed above. If it is determined that an AMP protocol is being used, method 1300 may proceed to operation 1308.

Accordingly, during operation 1308, data packets may be sent over both a Bluetooth and Wi-Fi connection. In various embodiments, the Bluetooth connection may be a Bluetooth or BLE connection. Accordingly, the data packets may be A2DP or BLE data packets. Thus, during operation 1308, the A2DP/BLE packets may be sent simultaneously over the Bluetooth connection and the Wi-Fi connection. As discussed above, and as will be discussed in greater detail below, the data packets are encapsulated for Wi-Fi transmission such that the A2DP/BLE packets are included in Wi-Fi data packets. Method 1300 may then proceed to operation 1312 discussed in greater detail below.

Returning to operation 1306, if it is determined that an AMP protocol is not being used, method 1300 may proceed to operation 1310 during which data packets may be sent over both the Bluetooth and an RTP/UDP/IP connection via the Wi-Fi connection. Accordingly, the A2DP/BLE packets may be sent simultaneously over the Bluetooth connection and the Wi-Fi connection, and the encapsulation technique may be configured based on the use of the RTP/UDP/IP connection.

Method 1300 may proceed to operation 1312 during which the sink device may be switched to the Wi-Fi connection. Accordingly, as discussed above, the sink device may implement synchronization operations, discard redundant data packets from the Bluetooth connection, and complete the switch over to the Wi-Fi connection. In various embodiments, the Bluetooth connection may be disconnected, and the Wi-Fi connection may be used for data transmission of encapsulated data packets.

Figure 14:
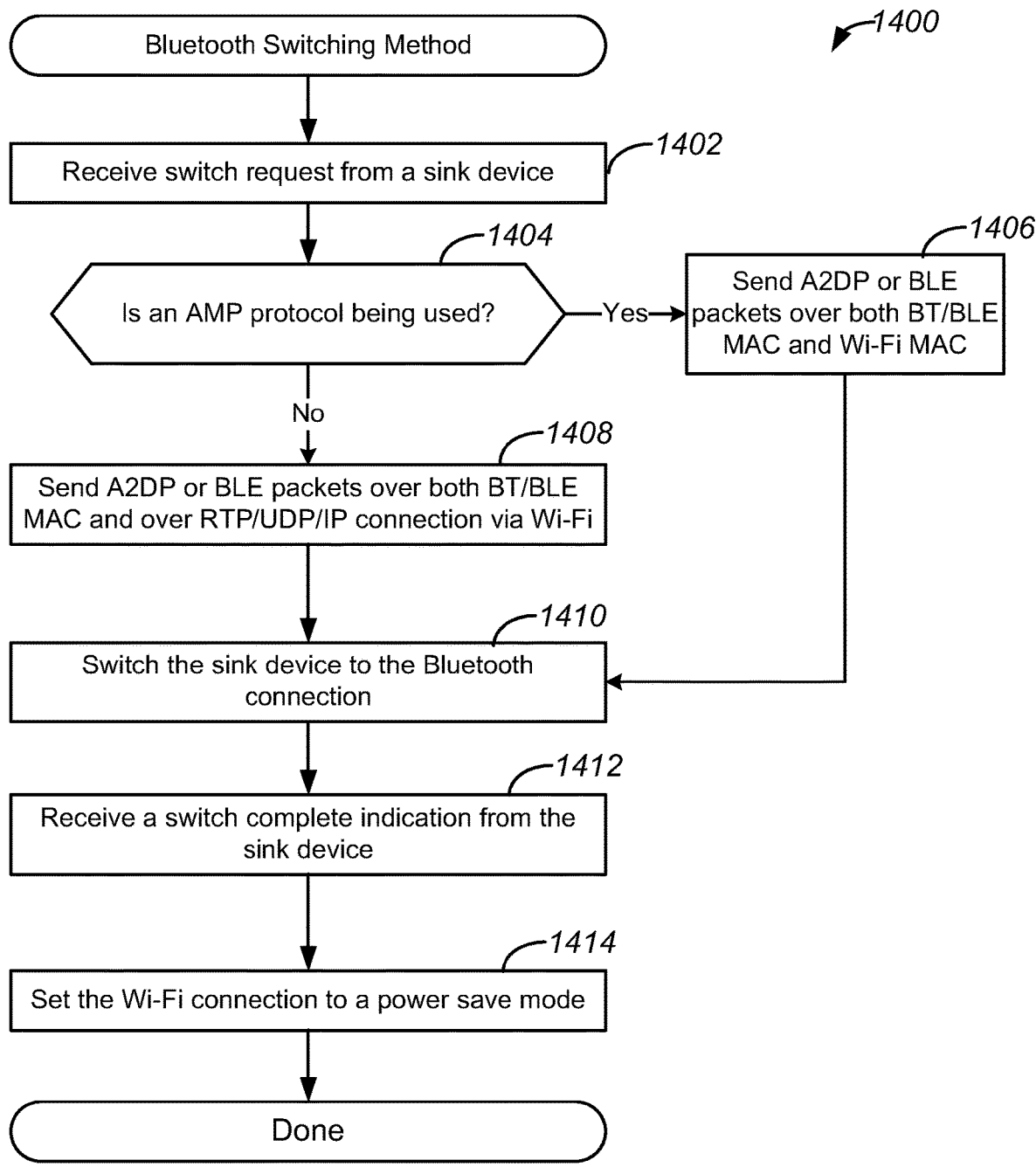
FIG. 14 illustrates a flow chart of an example of a method for Bluetooth switching, implemented in accordance with some embodiments.

FIG. 14 illustrates a flow chart of an example of a method for Bluetooth switching, implemented in accordance with some embodiments. As discussed above, a determination may be made to switch from a Wi-Fi radio to a Bluetooth radio. Thus, according to various embodiments, a method, such as method 1400, may be used to dynamically implement the switch in accordance with the capabilities of the source device and the sink device, as discussed above.

Method 1400 may commence with operation 1402 during which a switch request may be received from a sink device. As similarly discussed above, the request may be made to indicate that the sink device is ready for the switch, and the source device may proceed to initiate the switch. Operations underlying the determination to make the switch have been previously discussed above.

Method 1400 may proceed to operation 1404 during which it may be determined if an AMP protocol is being used. As similarly discussed above, such a determination may be made based on capabilities of the sink device as well as the source device, and may be made based on a query of hardware of such devices, as discussed above. If it is determined that an AMP protocol is being used, method 1400 may proceed to operation 1306.

Method 1400 may proceed to operation 1406 during which data packets may be sent over both a Bluetooth and Wi-Fi connection. In various embodiments, the Bluetooth connection may be a Bluetooth or BLE connection. Accordingly, the data packets may be A2DP or BLE data packets. Thus, during operation 1408, the A2DP/BLE packets may be sent simultaneously over the Bluetooth connection and the Wi-Fi connection. As discussed above, and as will be discussed in greater detail below, the data packets are encapsulated for Wi-Fi transmission such that the A2DP/BLE packets are included in Wi-Fi data packets. Method 1300 may then proceed to operation 1410 discussed in greater detail below.

Returning to operation 1404, if it is determined that an AMP protocol is not being used, method 1400 may proceed to operation 1408 during which data packets may be sent over both the Bluetooth and an RTP/UDP/IP connection via the Wi-Fi connection. Accordingly, the A2DP/BLE packets may be sent simultaneously over the Bluetooth connection and the Wi-Fi connection, and the encapsulation technique may be configured based on the use of the RTP/UDP/IP connection.

Method 1400 may proceed to operation 1410 during which the sink device may be switched to the Bluetooth connection. Accordingly, as discussed above, the sink device may implement synchronization operations, discard redundant data packets from the Wi-Fi connection, and complete the switch over to the Bluetooth connection.

Method 1400 may proceed to operation 1412 during which a switch complete indication may be received. In various embodiments, the switch complete indication may be a message sent from the sink device and received at the source device, and the message may provide acknowledgment that the switch to the Bluetooth connection has been completed, and the Wi-Fi connection is no longer needed.

Method 1400 may proceed to operation 1414 during which the Wi-Fi connection is set to a power save mode. Accordingly, as discussed above, the Wi-Fi connection may be transitioned to a power save mode to conserve power, and the Bluetooth connection may be used to stream the data packets.

Figure 15:
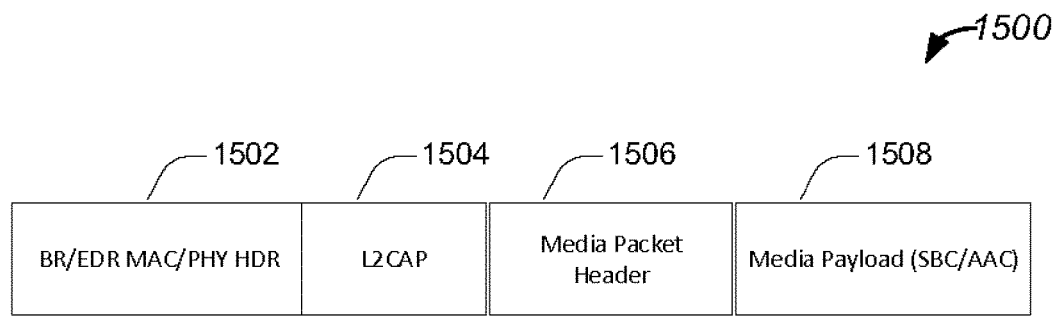
FIGS. 15-19 illustrate examples of packet encapsulation that may be implemented for seamless playback between wireless communications devices, configured in accordance with some embodiments.

FIGS. 15-19 illustrate examples of packet encapsulation that may be implemented for seamless playback between wireless communications devices, configured in accordance with some embodiments. For example, FIG. 15 illustrates a data packet structure configured to transmit an A2DP data packet over a Bluetooth connection. As shown in FIG. 15, data packet 1500 includes data field 1502 which is configured to store a Bluetooth header, data field 1504 which is configured to store L2CAP information such as an L2CAP header, data field 1506 which is configured to store a media packet header, and data field 1508 which is configured to store the media payload, which may be a portion of a streamed audio file.

Figure 16:
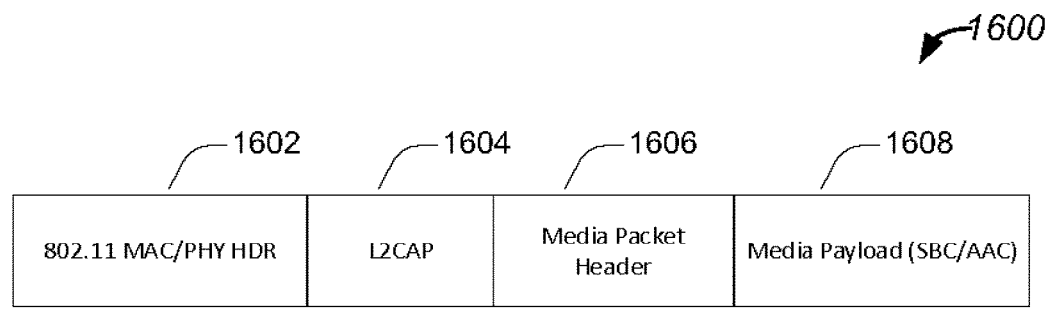

FIG. 16 illustrates a data packet structure configured to transmit an A2DP data packet over a Wi-Fi connection using an AMP protocol. As shown in FIG. 16, data packet 1600 includes data field 1602 which is configured to store a Wi-Fi header compliant with 802.11x, data field 1604 which is configured to store L2CAP information such as an L2CAP header, data field 1606 which is configured to store a media packet header, and data field 1608 which is configured to store the media payload.

Figure 17:
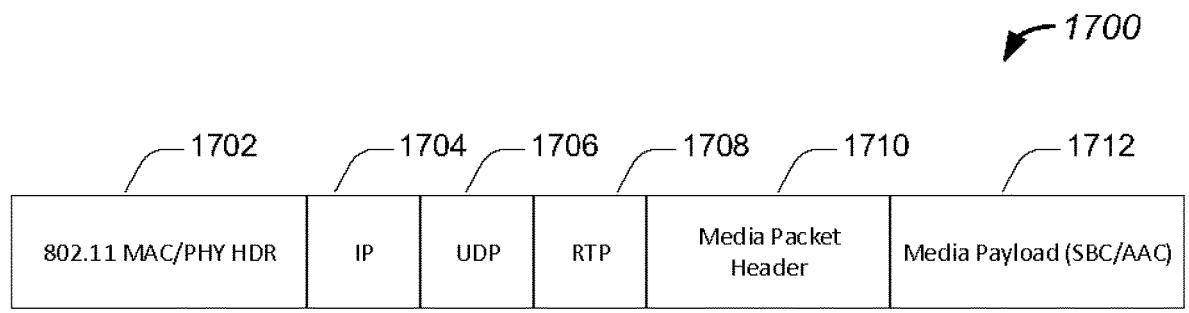

FIG. 17 illustrates a data packet structure configured to transmit an A2DP data packet over a Wi-Fi connection not using an AMP protocol. As shown in FIG. 17, data packet 1700 includes data field 1702 which is configured to store a Wi-Fi header, data fields 1704, 1706, and 1708 which are configured to store IP/UDP/RTP information, data field 1710 which is configured to store a media packet header, and data field 1712 which is configured to store the media payload.

Figure 18:
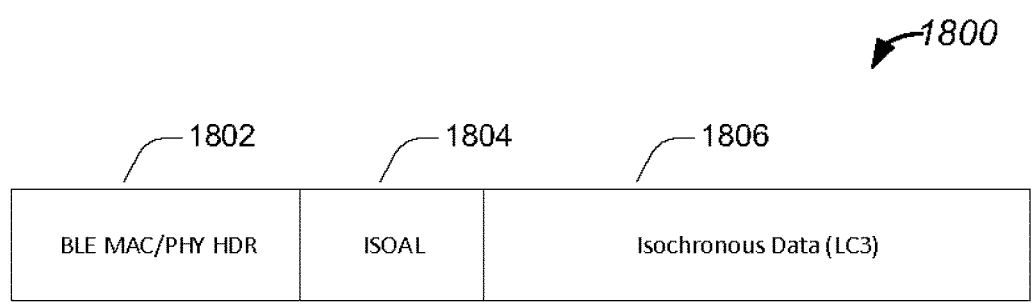

FIG. 18 illustrates a data packet structure configured to transmit a Bluetooth Low Energy Audio Packet over a Bluetooth Low Energy. As shown in FIG. 18, data packet 1800 includes data field 1802 which is configured to store a Bluetooth Low Energy header, data field 1804 which is configured to store ISOAL information such as an ISOAL header, and data field 1806 which is configured to store isochronous data.

Figure 19:
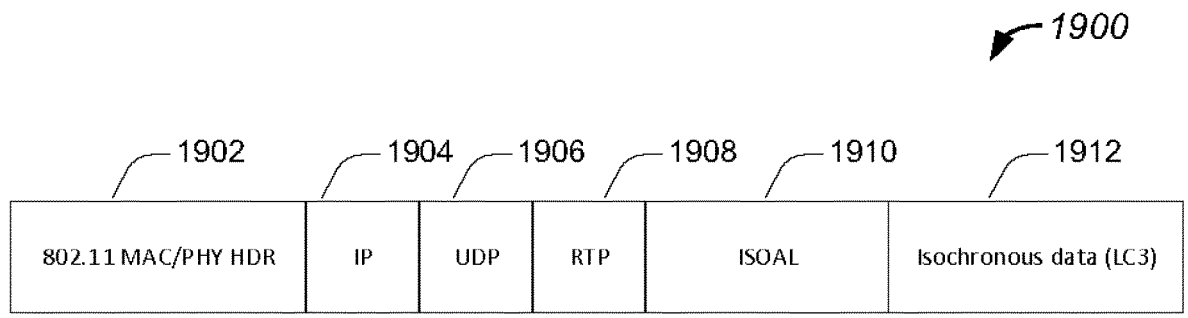

FIG. 19 illustrates a data packet structure configured to transmit a Bluetooth Low Energy Audio Packet over a Wi-Fi connection. As shown in FIG. 19, data packet 1900 includes data field 1902 which is configured to store a Bluetooth Low Energy header, data fields 1904, 1906, and 1908 which are configured to store IP/UDP/RTP information, data field 1910 which is configured to store ISOAL information such as an ISOAL header, and data field 1912 which is configured to store isochronous data.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
  establishing a first wireless connection between a first device and a second device, the first wireless connection using a first communication protocol;
  establishing a second wireless connection between the first device and the second device such that the first wireless connection and the second wireless connection have both been established;
  transmitting audio data via the first wireless connection;
  determining, using a processing device, a switch should be initiated based on one or more signal quality metrics representing an estimate of a quality of the first wireless connection; and
  switching to the second wireless connection using a second communication protocol, the switching comprising beginning encapsulation of the audio data in Bluetooth packets, performing data packet synchronization operations, and seamlessly transmitting the audio data via the second wireless connection in accordance with the second communication protocol, wherein the Bluetooth packets are encapsulated in one or more packets of the second communication protocol, and wherein the data packet synchronization operations align audio data while simultaneous transmission is occurring on the first wireless connection and the second wireless connection.

2. The method of claim 1, wherein the second communication protocol is a Wi-Fi communication protocol.

3. The method of claim 2, wherein the audio data is transmitted using Bluetooth A2DP data packets, and wherein audio data transmitted on the second wireless connection comprises Bluetooth A2DP data packets encapsulated for transmission using the Wi-Fi communication protocol.

4. The method of claim 1, wherein the one or more signal quality metrics include a packet loss value associated with the first wireless connection.

5. The method of claim 1, wherein the one or more signal quality metrics include a bit error rate value associated with the first wireless connection.

6. The method of claim 5 further comprising estimating the bit error rate based on at least one of an RSSI value, a bit reliability value, and a distance between the first device and the second device.

7. The method of claim 1, wherein the first device is an audio streamer, wherein the second device is a wireless headset, and wherein the switching is implemented while the wireless headset is playing received audio data.

8. The method of claim 1, wherein the switching further comprises:
  transmitting the audio data on both the first wireless connection and the second wireless connection;
  receiving a switch complete notification from the second device; and
  disconnecting the first wireless connection.

9. The method of claim 1, wherein the first communication protocol is a Bluetooth Low Energy communication protocol, and wherein the second communication protocol is a Wi-Fi communication protocol.

10. A system comprising:
  a first transceiver included in a first device and configured to transmit and receive data values via a first wireless connection and in accordance with a Bluetooth communication protocol;
  a second transceiver included in the first device and configured to transmit and receive data values via a second wireless connection and in accordance with a Wi-Fi communication protocol;
  a first antenna coupled to the first transceiver;
  a second antenna coupled to the second transceiver; and
  a processing device comprising one or more processors configured to:
    establish, via the first transceiver, a first wireless connection between the first device and a second device;
    establish, via the second transceiver, a second wireless connection between the first device and the second device such that the first wireless connection and the second wireless connection have both been established;
    transmit audio data via the first wireless connection;
    determine a switch should be initiated based on one or more signal quality metrics representing an estimate of a quality of the first wireless connection; and
    switch to the second wireless connection, the switching comprising beginning encapsulation of the audio data in Bluetooth packets, performing data packet synchronization operations, and seamlessly transmitting the audio data via the second wireless connection in accordance with the Wi-Fi communication protocol, wherein the Bluetooth packets are encapsulated in one or more data packets of the Wi-Fi communication protocol, and wherein the data packet synchronization operations align audio data while simultaneous transmission is occurring on the first wireless connection and the second wireless connection.

11. The system of claim 10, wherein the one or more signal quality metrics include a packet loss value associated with the first wireless connection.

12. The system of claim 11, wherein the audio data is transmitted using Bluetooth A2DP data packets, and wherein audio data transmitted on the second wireless connection comprises Bluetooth A2DP data packets encapsulated for transmission using the Wi-Fi communication protocol.

13. The system of claim 10, wherein the one or more signal quality metrics include a bit error rate value associated with the first wireless connection.

14. The system of claim 10, wherein the first device is an audio streamer, and wherein the second device is a wireless headset.

15. The system of claim 14, wherein the switching is implemented while the wireless headset is playing received audio data.

16. A device comprising:
a first transceiver included in a first device and configured to transmit and receive data values via a first wireless connection and in accordance with a first communication protocol;
a second transceiver included in the first device and configured to transmit and receive data values via a second wireless connection and in accordance with a second communication protocol; and
a processing device comprising one or more processors configured to:
establish, via the first transceiver, a first wireless connection between the first device and a second device;
establish, via the second transceiver, a second wireless connection between the first device and the second device such that the first wireless connection and the second wireless connection have both been established;
transmit audio data via the first wireless connection;
determine a switch should be initiated based on one or more signal quality metrics representing an estimate of a quality of the first wireless connection; and
switch to the second wireless connection, the switching comprising beginning encapsulation of the audio data in Bluetooth packets, performing data packet synchronization operations, and seamlessly transmitting the audio data via the second wireless connection in accordance with the second communication protocol, wherein the Bluetooth packets are encapsulated in one or more data packets of the second communication protocol, and wherein the data packet synchronization operations align audio data while simultaneous transmission is occurring on the first wireless connection and the second wireless connection.

17. The device of claim 16, wherein the second communication protocol is a Wi-Fi communication protocol, wherein the audio data is transmitted using Bluetooth A2DP data packets, and wherein audio data transmitted on the second wireless connection comprises Bluetooth A2DP data packets encapsulated for transmission using the Wi-Fi communication protocol.

18. The device of claim 16, wherein the one or more signal quality metrics include a packet loss value associated with the first wireless connection.

19. The device of claim 16, wherein the one or more signal quality metrics include a bit error rate value associated with the first wireless connection.

20. The device of claim 16, wherein the first device is an audio streamer, and wherein the second device is a wireless headset, and wherein the switching is implemented while the wireless headset is playing received audio data.

* * * * *